US006430490B1

(12) United States Patent
Watanabe et al.

(10) Patent No.: US 6,430,490 B1
(45) Date of Patent: Aug. 6, 2002

(54) HYDRAULIC CIRCUIT CONTROL DEVICE OF CONSTRUCTION MACHINERY

(75) Inventors: Hiroshi Watanabe, Ushiku; Shuji Ohira, Tsukuba; Kazuo Fujishima, Ibaraki-ken; Hiroshi Ogura, Ryugasaki; Masakazu Haga; Sadahisa Tomita, both of Ibaraki-ken, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/806,200

(22) PCT Filed: Jul. 27, 2000

(86) PCT No.: PCT/JP00/05026

§ 371 (c)(1),
(2), (4) Date: Mar. 27, 2001

(87) PCT Pub. No.: WO01/09440

PCT Pub. Date: Feb. 8, 2001

(30) Foreign Application Priority Data

Jul. 29, 1999 (JP) .......................................... 11-214825

(51) Int. Cl.[7] ............................ G01B 3/00; F16D 31/02
(52) U.S. Cl. .............................. 701/50; 33/37; 33/1.68; 180/53.4
(58) Field of Search .......................... 701/50; 180/53.4; 73/1.68, 37

(56) References Cited

U.S. PATENT DOCUMENTS 4,400,937 A * 8/1983 Lobmeyer et al. .......... 417/218
4,801,247 A * 1/1989 Hashimoto et al. ......... 417/213
5,257,960 A * 11/1993 Sato ............................ 474/28

FOREIGN PATENT DOCUMENTS

| | | |
|---|---|---|
| JP | 58-165585 | 9/1983 |
| JP | 62-13542 | 3/1987 |
| JP | 62-39295 | 8/1987 |
| JP | 5-195554 | 8/1993 |
| JP | 5-195557 | 8/1993 |
| JP | 7-12104 | 1/1995 |
| JP | 7-107279 | 11/1995 |
| JP | 2509311 | 4/1996 |
| JP | 10-37247 | 2/1998 |

* cited by examiner

*Primary Examiner*—Yonel Beaulieu
*Assistant Examiner*—Olga Hernandez
(74) *Attorney, Agent, or Firm*—Mattingly, Stanger & Malur, P.C.

(57) ABSTRACT

Whether a previously computed valve command value Y−1 is within a neutral zone ±α is determine. If the determination result is "Yes", processing to compute a valve command value for a neutral dead zone is executed. If the determination result is "No", processing to compute a valve command value for a driving zone is executed. In the latter case, by using a valve command value X and the previously computed valve command value Y−1, it is determined in which one of acceleration, deceleration/stop, and lever-reversed condition is the operating status, and a maximum setting rate in one of acceleration, deceleration/stop, and lever-reversed condition is computed from a corresponding function ΔY=fmax1(X), etc. Then, a control signal is computed while restraining a change rate of the operational signal to be kept not more than the computed maximum change rate, and a flow control valve 3 is controlled in accordance with the computed control signal. As a result, in a hydraulic drive system for controlling a flow control valve with an electrical operational signal to control the operation of an actuator, the flow control valve can be controlled at an optimum maximum change rate in any operating status of acceleration, deceleration/stop, and lever-reversed condition.

6 Claims, 16 Drawing Sheets

HYDRAULIC CIRCUIT CONTROL DEVICE OF CONSTRUCTION MACHINERY

TECHNICAL FIELD

The present invention relates to a hydraulic circuit control system for a construction machine in which an operating system of the construction machine, particularly a control lever device, comprises a joystick device of the type generating an electrical operational signal (electric signal) depending on an input amount upon shift of a control lever, and a flow control valve is controlled with the operational signal for controlling the operation of an actuator.

BACKGROUND ART

In recent construction machines, particularly in those machines that are employed for various kinds of works because of convenience in use as represented by hydraulic excavators, operability has become increasingly valued in making the machines adaptable for a variety of usages. Stated otherwise, taking a hydraulic excavator as an example, the machine must be able to operate a working device as intended by an operator over a wide range from work in which primary importance is put on the amount of work carried out by the machine, e.g., excavation, to work in which fine adjustment is required in operation, e.g., leveling. To that end, it has been proposed to employ a hydraulic circuit control system in which a control lever device comprises an electric joystick for generating an electrical operational signal depending on an input amount upon shift a control lever, and the operational signal is electrically processed to control a flow control valve with a processed signal. Several known examples of such a control system are as follows.

(1) Japanese Patent No. 2509311 entitled "Working Device Control Method for Construction Machine"

This publication discloses a working device control method for a construction machine comprising a hydraulic control valve (operational valve), which is operated through a controller upon manipulation of an electrical lever, and a pump varying device. Modulation control is performed to absorb shocks caused upon operation of the operational valve and the pump varying device by setting a modulation pattern for rise/fall of a circuit pressure and increase/decrease of a pump delivery rate upon operation of the operational valve to restrict a maximum operating speed of the operational valve (maximum change rate of an operational signal) so that a rate of the rise/fall of the circuit pressure and increase/decrease of the pump delivery rate is gradually changed in multiple stages with a working time, and by operating the operational valve and the pump varying device so as not to move faster than the speeds set by the modulation pattern when the circuit pressure rises and falls at a constant rate with a working time. Furthermore, a cavitation is prevented from occurring upon operation of the pump varying device. This publication also discloses that a plurality of modulation patterns for the operational valve are prepared and one of the patterns is set depending on the working condition automatically or manually with selection by an operator.

(2) JP,B 7-107279 entitled "Working Device Control Method for Construction Machine"

This publication discloses an improvement of the modulation control in the above-mentioned (1). At the time when an electrical lever is manipulated from a shift position on the side in one direction toward the side in an opposite direction in a continuous manner and an operational signal from the electrical lever enters the opposite direction side beyond a dead zone corresponding to a neutral position, the modulation pattern having been effective so far is released and another modulation pattern for the opposite direction side is made effective. The operation of a working device and an operating feeling in the lever-reversed operation are thereby matched with each other.

(3) JP,A 10-37247 entitled "Operation Control Device and Operation Control method"

This publication discloses a hydraulic circuit controller for controlling the operation of a working device of a construction machine through a flow control valve, wherein a maximum change rate of an operational signal for the flow control valve is restrained to be not larger than a setting value, and the operation of the working device is controlled by changing the setting value depending on an input amount upon shift of a control lever.

Meanwhile, there is also known a hydraulic circuit control system in which an actuator speed is controlled by controlling a delivery rate of a hydraulic pump with an operational signal instead of controlling a flow control valve with the operational signal, and a maximum operating speed of a pump displacement varying mechanism is restrained. Several examples of such a hydraulic circuit control system are as follows.

(4) JP,B 62-13542 entitled "Controller for Hydraulic Circuit"

This publication discloses a hydraulic circuit controller for a closed circuit system wherein an actuator speed is controlled to a speed instructed by an operating device by controlling a delivery rate of a hydraulic pump (position of a pump displacement varying mechanism). When an operating speed of the pump displacement varying mechanism is restrained to be not larger a setting maximum speed, the setting maximum speed is changed depending on an input amount upon shift of a control lever, thereby controlling acceleration/deceleration of an actuator.

(5) JP,B 62-39295 entitled "Control System for Hydraulic Circuit Apparatus"

This publication discloses that the controller of the above-mentioned (4) is modified so as to detect a condition of the operating device (control lever) instructing the operation to be stopped or made in the reversed direction, and to set the setting maximum speed larger than that in acceleration.

DISCLOSURE OF INVENTION

The above-described prior art however has the following problems.

First problem: The setting value for restricting the maximum operating speed of the operational valve (flow control valve) (i.e., the maximum change rate of the operational signal) is not set corresponding to individual operating status, i.e., acceleration, deceleration/stop, and lever-reversed condition. Therefore, the operational valve cannot be always controlled at an optimum maximum change rate adapted for the operating status of a construction machine.

Second problem: In the lever-reversed operation, the dead zone in the vicinity of a neutral position of the flow control valve is not appropriately handled or not handled at all. When quickly reversing the control lever, therefore, the actuator undergoes a shock or stalls in the vicinity of the neutral position, causing the operator to feel a pause in the operation.

Third problem: Since the maximum change speed of the operational valve is just restrained to the fixed modulation pattern regardless of the input amount upon shift of the control lever, an appropriate acceleration/deceleration feeling corresponding to the lever shift amount cannot be provided.

More specifically, in Japanese Patent No. 2509311 and JP,B 7-107279, the modulation patterns are set for the maximum operating speed of the operational valve in acceleration and deceleration/stop, and in the lever-reversed operation, the maximum operating speed of the operational valve is restricted in accordance with the modulation pattern for deceleration/stop. However, the lever reversing is performed when it is required to quickly change the moving direction of the working device in the case of, e.g., dropping mud from a bucket, bumping a boom against a vertical surface, or avoiding a risk, and a rapid response is demanded until the working device changes the moving direction. Accordingly, restricting the maximum operating speed of the operational valve in the lever-reversed operation in accordance with the modulation pattern for deceleration/stop cannot be the as providing an optimum maximum operating speed for the lever-reversed operation, and hence cannot change the moving direction of the working device with a good response (first problem).

Also, according to JP,B 7-107279, as soon as the operational signal indicates a reversed direction, the modulation control performed so far is ceased and another modulation control adapted for the reversed direction is started for the purpose of improving response in the lever-reversed operation disclosed in Japanese Patent No. 2509311. Taking into account a delay in the operation of the actuator responsive to the operational signal, therefore, the actuator is brought into an uncontrolled state at the moment when the operating direction is changed, which leads to a possibility that a substantial shock may occur until the moving direction of the actuator is completely changed (second problem).

Further, in Japanese Patent No. 2509311 and JP,B 7-107279, because the modulation pattern is fixed and the maximum operating speed of the operational valve is always restricted to the fixed modulation pattern regardless of the input amount upon shift of the control lever, an appropriate acceleration/deceleration feeling corresponding to the lever shift amount cannot be provided (third problem). In the case of returning the control lever, for example, when the control lever is manipulated so as to operate the operational valve at a speed higher than that set by the modulation pattern, the maximum operating speed of the operational valve is determined by the fixed modulation pattern regardless of a manner in which the control lever is returned, and therefore cannot be adjusted.

In JP,A 10-37247, since the maximum operating speed of the operational valve is not set depending on the operating status of the construction machine, the operational valve cannot be controlled at an optimum maximum change rate adapted for the operating status (first problem), and an appropriate acceleration/deceleration feeling corresponding to the lever shift amount cannot be provided (third problem). Furthermore, no consideration is paid on how to handle the lever-reversed operation (second problem).

In JP,B 62-13542 and JP,B 62-39295, the position of the pump displacement varying mechanism is controlled in response to an instruction from the operating device to control the pump delivery rate, thereby controlling the actuator speed. That is to say, these are not intended to control the operation of the working device of the construction machine through the flow control valve. Also, in the system of JP,B 62-39295, a plurality of maximum change rates of the operational signal are set as a function of the operational signal. However, because a control target of the control lever is the pump displacement varying mechanism, no consideration is paid to the dead zone in the vicinity of the neutral position of the flow control valve. Accordingly, if the disclosed arrangement is applied to a hydraulic circuit control system for controlling an actuator speed through a flow control valve, the maximum change rate of an operational signal is restrained in a similar manner even when the flow control valve is within the dead zone in the vicinity of its neutral position, whereby an actuator stalls for a certain period of time, causing the operator to feel a pause in the operation (second problem).

A first object of the present invention is to provide a hydraulic circuit control system for a construction machine of the type controlling a flow control valve with an electrical operational signal to control the operation of an actuator, the control system being able to control the flow control valve at an optimum maximum change rate in any operating status of acceleration, deceleration/stop, and lever-reversed condition with resulting characteristics cited below:

(a) in acceleration/deceleration, the machine undergoes a less shock and an operator feels no delay in the operation even with the operator manipulating a control lever quickly;

(b) in moderate acceleration/deceleration, the actuator is moved as intended by the operator;

(c) in stop operation, the machine undergoes a less shock and the operator feels no delay in motion toward stop even with the operator manipulating the control lever quickly; and (d) in quick lever reversing, the actuator can be rapidly reversed in motion.

A second object of the present invention is to provide a hydraulic circuit control system for a construction machine, which carries out, in addition to the above, proper processing for a dead zone in the vicinity of a neutral position of the flow control valve in the lever-reversed operation, whereby the machine undergoes a less shock and the operator feels neither a delay in the operation nor a pause in the operation in the vicinity of the neutral position when the control lever is quickly reversed.

A third object of the present invention is to provide a hydraulic circuit control system for a construction machine, which can give the operator an appropriate feeling in acceleration and deceleration corresponding to an input amount upon shift of the control lever.

(1) To achieve the above first object, the present invention provides a hydraulic circuit control system for a construction machine comprising a hydraulic actuator for driving a working device, a hydraulic pump driven by a prime mover and producing a pressurized hydraulic fluid, a flow control valve disposed between the hydraulic actuator and the hydraulic pump and controlling a flow rate of the hydraulic fluid, and operational signal generating means for generating an electrical operational signal to instruct a flow rate of the hydraulic fluid flowing through the flow control valve, the system computing a control signal while restraining a change rate of the operational signal to be kept not more than a preset maximum change rate, and controlling the flow control valve in accordance with the computed control signal, wherein the system comprises first determining means for determining the operating status of the construction machine based on the operational signal; and first processing means for setting therein an optimum maximum change rate of the control signal for the flow control valve beforehand for each operating status of the construction machine, determining an optimum maximum change rate adapted for the operating status of the construction machine at that time based on a determination result of the first determining means, and setting the determined optimum maximum change rate as a maximum change rate of the control signal for the flow control valve.

Thus, since the first determining means determines the operating status of the construction machine and first processing means determines an optimum maximum change rate adapted for the operating status of the construction machine at that time based on a determination result of the first determining means and then sets the determined optimum maximum change rate as a maximum change rate of the control signal for the flow control valve, the change rate of the control signal for controlling the flow rate through the flow control valve is restrained to be kept not more than the determined optimum maximum change rate. Therefore, the flow control valve can be controlled at the optimum maximum change rate in any operating status of acceleration, deceleration/stop, and lever-reversed condition with such resulting characteristics as (a) in acceleration/deceleration, the machine undergoes a less shock and an operator feels no delay in the operation even with the operator manipulating a control lever quickly; (b) in moderate acceleration/deceleration, the actuator is moved as intended by the operator; (c) in operation for stop, the machine undergoes a less shock and the operator feels no delay in the motion toward stop even with the operator manipulating the control lever quickly; and (d) in quick lever reversing, the actuator can be rapidly reversed in motion, whereby working efficiency and safety are improved.

(2) To achieve the above second object, according to the present invention, in the hydraulic circuit control system for a construction machine of the above-mentioned (1), the system further comprises second determining means for determining whether a value of the control signal for the flow control valve is within a neutral zone; and second processing means for computing the control signal in accordance with the operational signal when the value of the control signal for the flow control valve is within the neutral zone, instead of executing the processing to restrain the change rate of the control signal in accordance with the maximum change rate.

With those features, proper processing for a dead zone in the vicinity of the neutral position of the flow control valve is executed in the lever-reversed operation so that, when the control lever is quickly reversed, the machine undergoes a less shock and the operation can be performed without causing the operator to feel neither a delay in the operation nor a pause in the operation in the vicinity of the neutral position. As a result, operability in the lever-reversed operation is greatly improved.

(3) In the above-mentioned (1), preferably, the first determining means determines, based on a state of the operational signal, in which one of acceleration, deceleration/stop, and lever-reversed condition the operating status of the hydraulic excavator is, and the first processing means determines the optimum maximum change rate adapted for the operating status of the construction machine at that time based on the optimum maximum change rate of the control signal set beforehand for each operating status of acceleration, deceleration/stop, or lever-reversed condition.

With those features, as with the above-mentioned (1), the flow control valve can be controlled at the optimum maximum change rate in any operating status of acceleration, deceleration/stop, and lever-reversed condition.

(4) Also, in the above-mentioned (1) or (3), preferably, the first determining means determines the operating status of the construction machine based on the operational signal and a previously outputted control signal for the flow control valve.

With that feature, the first determining means can determine the operating status of the construction machine including acceleration, deceleration/stop, and lever-reversed condition.

(5) To achieve the above third object, according to the present invention, in any one of the above-mentioned (1), (3) and (4), the optimum maximum change rate of the control signal for the flow control valve is set beforehand as a function of the operational signal for each operating status of the construction machine, and the first processing means computes the optimum maximum change rate based on the function of the operational signal corresponding to the operating status determined by the first determining means and the operational signal at that time.

With those features, the optimum maximum change rate of the control signal is set depending the value of the operational signal, and hence an appropriate feeling in acceleration and deceleration corresponding to the input amount upon shift of the control lever can be provided.

(6) In any one of the above-mentioned (1), (3) and (4), preferably, the optimum maximum change rate of the control signal for the flow control valve is set beforehand as a function of the operational signal or a function of the previously outputted control signal for the flow control valve for each operating status of the construction machine, and the first processing means computes the optimum maximum change rate based on the function of the operational signal corresponding to the operating status determined by the first determining means or the function of the previously outputted control signal for the flow control valve and the operational signal at that time or the previously outputted control signal for the flow control valve.

With those features, the optimum maximum change rate of the control signal is set depending both the value of the operational signal and the previously outputted control signal, and hence an appropriate feeling in acceleration and deceleration corresponding to the input amount upon shift of the control lever can be provided.

BRIEF DESCRIPTION OF THE DRAWINGS

FIG. 10(*a*) shows the case of quickly manipulating a control lever, and FIG. 10(*b*) shows the case of moderately manipulating a control lever.

BEST MODE FOR CARRYING OUT THE INVENTION

Embodiments of the present invention will be described below with reference to the drawings.

Figure 1:
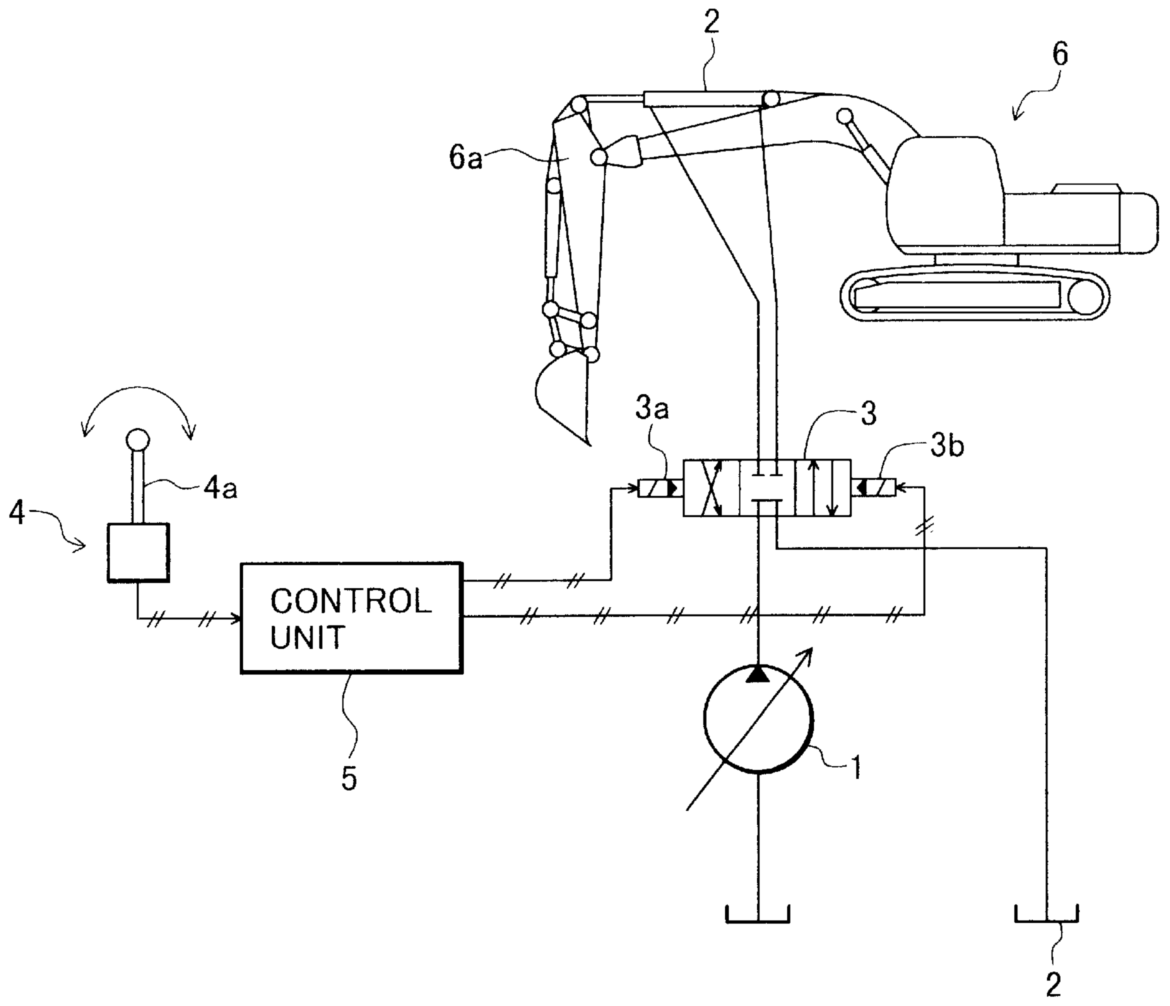
FIG. 1 is an explanatory view showing an overall arrangement of a hydraulic circuit control system for a construction machine according to a first embodiment of the present invention.

FIG. 1 represents one embodiment of the case where the present invention is applied to a hydraulic circuit control system for a hydraulic excavator as a typical example of construction machines. Note that, for simplification of the description, FIG. 1 shows part of the hydraulic circuit control system that is related to a hydraulic cylinder for driving an arm of the hydraulic excavator.

Referring to FIG. 1, the hydraulic circuit control system of this embodiment comprises a hydraulic pump 1; an actuator 2 such as a hydraulic cylinder; a flow control valve 3 for controlling a direction and a flow rate of a hydraulic fluid delivered from the hydraulic pump 2 and flowing a hydraulic cylinder; proportional solenoid valves 3*a*, 3*b* for driving the flow control valve 3; a control lever device 4 including a control lever 4*a* and outputting an electrical operational signal instructing the flow rate through the flow control valve 3; and a control unit 5 for outputting drive signals to the proportional solenoid valves 3*a*, 3*b* in accordance with the operational signal from the control lever device 4 and driving the flow control valve 3. In FIG. 1, the actuator 2 is shown as a hydraulic cylinder for driving an arm 6*a* of a working device of a hydraulic excavator 6, but it may be another actuator for driving another component of the working device.

Figure 2:
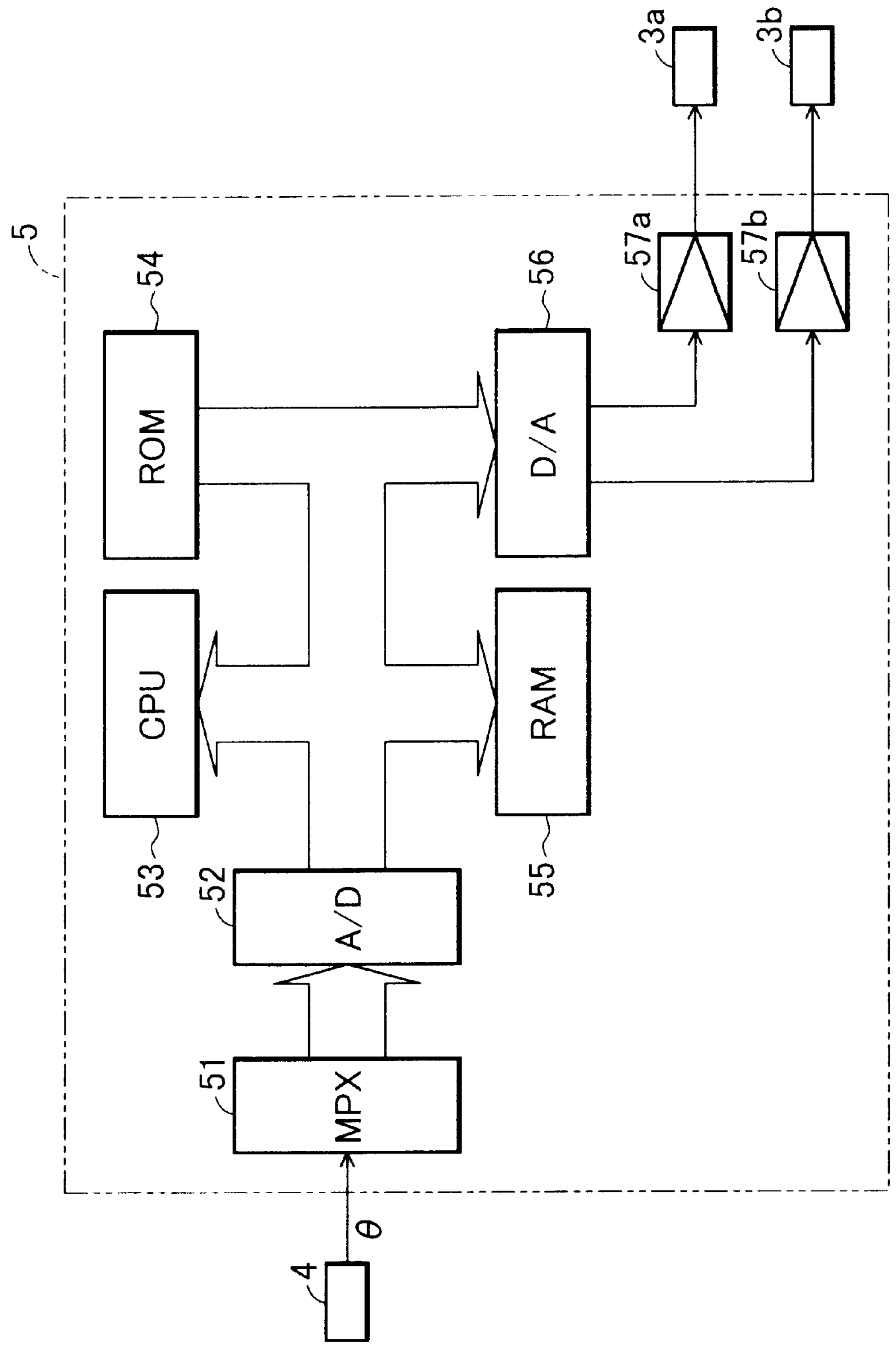
FIG. 2 is a block diagram showing a configuration of a control unit shown in FIG. 1.

FIG. 2 shows a configuration of the control unit 5. The control unit 5 comprises a ROM memory 54 for storing a program instructing overall control procedures of the control unit 5; a CPU 53 for controlling the entirety of the control unit in accordance with the program stored in the ROM memory 54; a multiplexer (MUX) 51 for selectively receiving signals outputted from the control lever device 4 in accordance with an instruction from the CPU 53; an A/D converter 52 for converting the signal inputted to the multiplexer 51 into a digital signal; a RAM memory 55 for temporarily storing numeral values, etc. in the course of the control processing; a D/A converter 56 for converting a command value, provided as a digital value from the CPU 53, into an analog signal; and amplifiers 57*a*, 57*b* for amplifying the signal outputted from the D/A converter 56 and outputting the drive signals for the proportional solenoid valves 3*a*, 3*b*.

Figure 3:
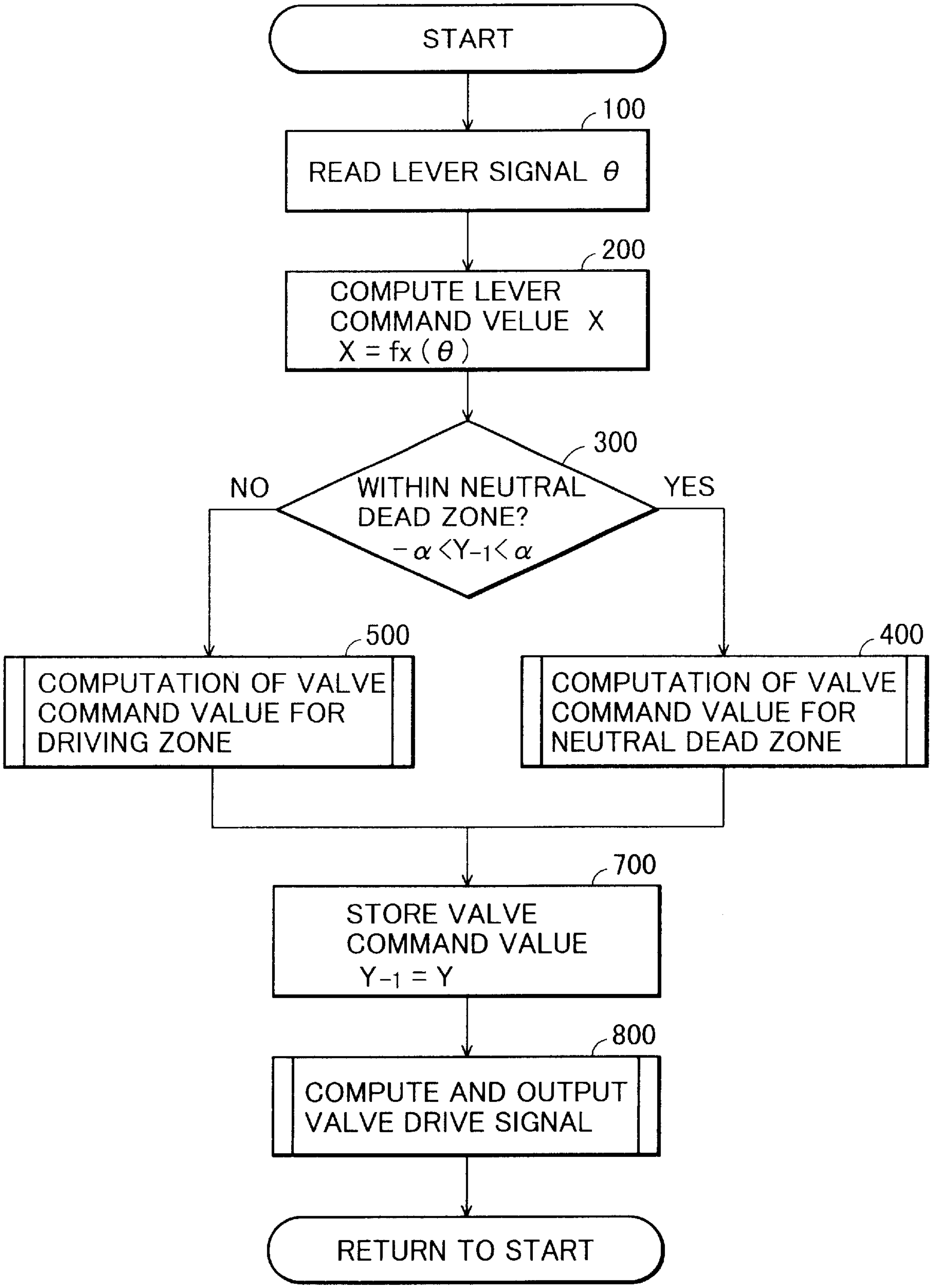
FIG. 3 is a flowchart showing control processing executed in the control unit shown in FIG. 1.

FIG. 3 shows, in the form of a flowchart, control procedures (program) of the CPU 53 stored in the ROM 54 of the control unit 5. The control procedures will be described below following the flowchart of FIG. 3.

In FIG. 3, the CPU 53 first reads in block 100 an operational signal (referred to also as a lever signal hereinafter) $\theta$ of the control lever device 4, and stores it in the RAM 55 temporarily. Then, in block 200, the read lever signal $\theta$ is converted into a lever command value X. Then, in block 300, it is determined using a previously computed valve command value Y−1, which is a command value having been outputted at present, whether the valve command value Y−1 is within the range of $\pm\alpha$ not including boundary values $\pm\alpha$ at both ends of a neutral zone (referred to also as a "neutral zone ($\pm\alpha$)" hereinafter). That is to say, whether $-\alpha<Y-1<\alpha$ holds or not is determined. If it is determined in block 300 that the previously computed valve command value Y−1 is within the neutral zone, the CPU proceeds to block 400.

The lever command value X and the valve command values Y, Y−1 are described here. The lever command value X and the valve command values Y, Y−1 are each a command value for specifying a spool position of the flow control valve 3. More specifically, the lever command value X is a current input command value for the control lever device 4 before being subjected to arithmetic processing, and the valve command value Y is a command value obtained after the arithmetic processing described below. The actual spool position is controlled in accordance with the valve command value Y. Also, the previously computed valve command value Y−1 is a valve command value computed by the processing in a cycle of the flowchart shown in FIG. 3, which precedes one the current cycle. At present, the system is in a state just after a drive signal corresponding to the valve command value Y−1 has been outputted, and the spool position is being controlled in accordance with the valve command value Y−1.

Figure 4:
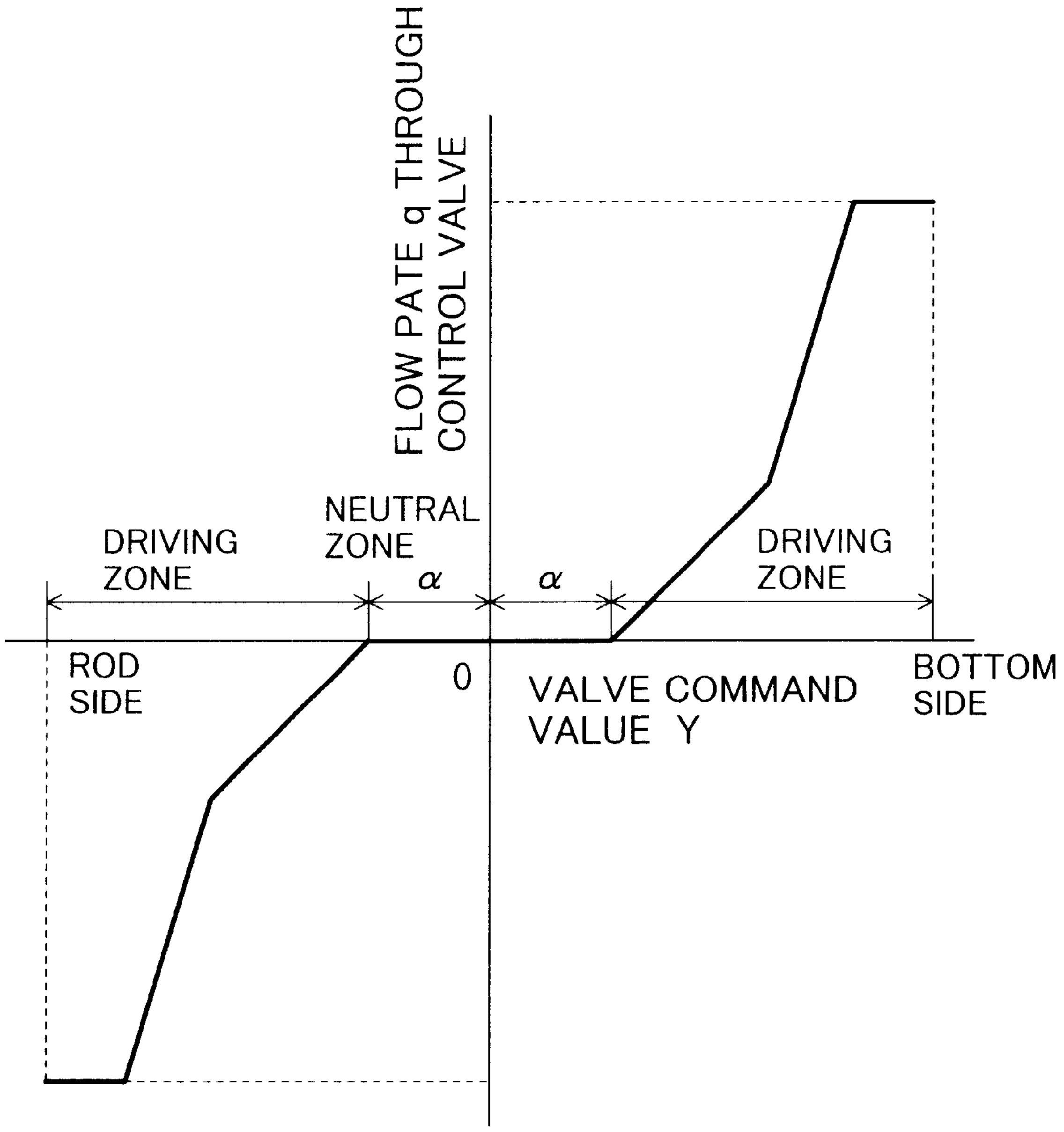
FIG. 4 is a characteristic graph showing a relationship between a valve command value Y computed by the control unit and a flow rate q of a hydraulic fluid flowing through a flow control valve controlled in accordance with the valve command value.

FIG. 4 shows one example of the relationship between the valve command value Y and a flow rate q of the hydraulic fluid flowing through the flow control valve 3. As shown in FIG. 4, the flow rate q through the flow control valve 3 is 0 when the valve command value Y is within the neutral zone ($\pm\alpha$). When the valve command value Y exceeds the neutral zone, the flow rate q is also increased as an absolute value of the valve command value Y increases. The relationship of the valve command value Y versus the flow rate q, shown in FIG. 4, represents general one, and there is an optimum relationship for each actuator to be controlled. Further, the relationship may be set so as to provide different characteristics depending on the operating direction.

Figure 5:
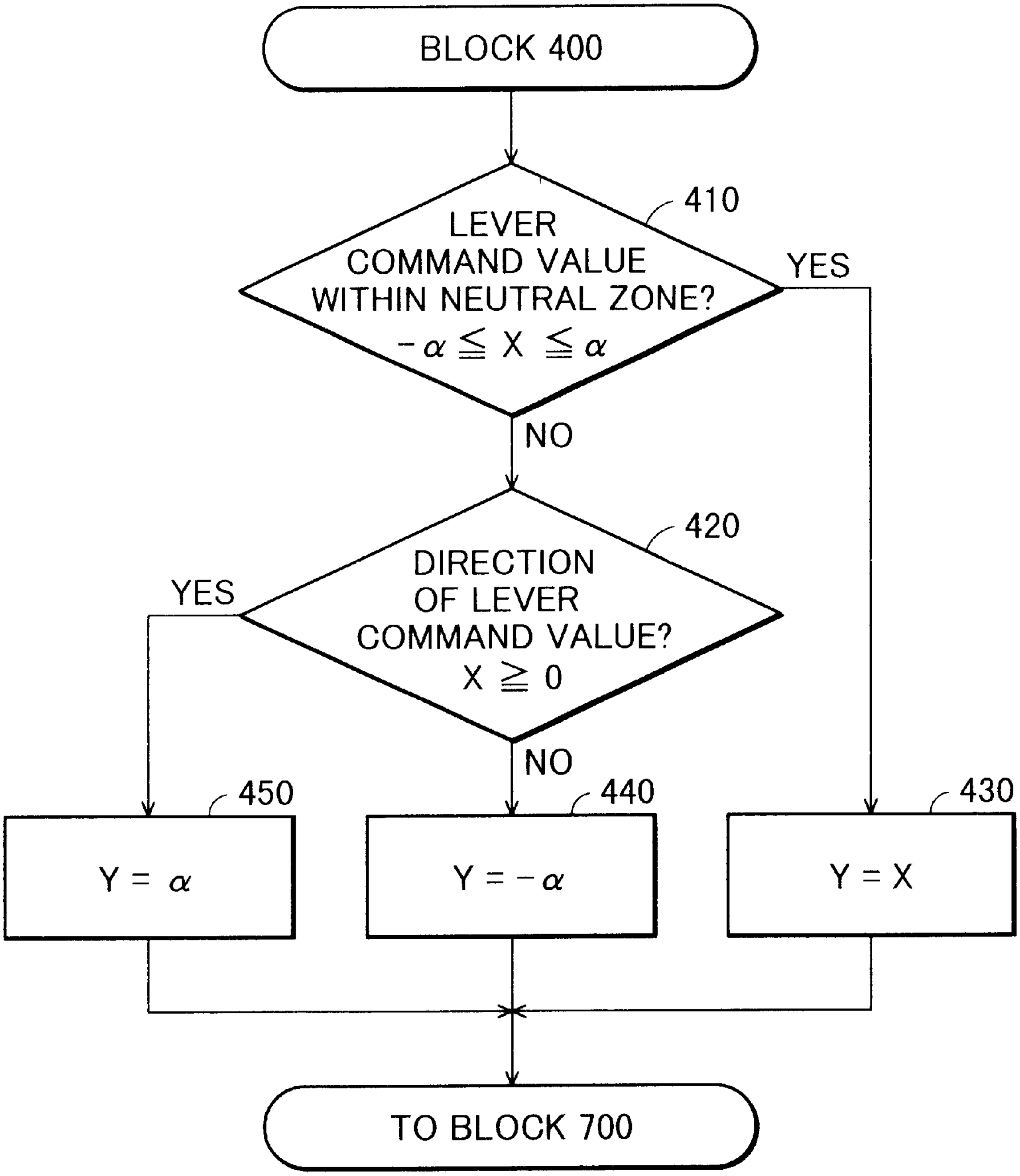
FIG. 5 is a flowchart showing details of "computation of valve command value for neutral dead zone" in the control processing shown in the flowchart of FIG. 3.

FIG. 5 shows details of block 400. Since it is determined in block 300 (see FIG. 3) that the previously computed valve command value Y−1 (current operation command value) is within the neutral zone, the valve command value Y for the neutral zone is computed in block 400.

In FIG. 5, the CPU first determines in block 410 whether the lever command value X (current lever input command value) is within the range of $\pm\alpha$ including the boundary values $\pm\alpha$ at both the ends of the neutral zone (referred to also as a "neutral zone ($\pm\alpha$)" hereinafter). That is to say, whether $-\alpha \leqq Y-1 \leqq \alpha$ is satisfied or not is determined. If the determination result in block 410 is "Yes", this means that the valve command value Y−1 (current operation command value) and the lever command value X (current lever input command value) are both within the neutral zone (±α). If it is "No", this means that the valve command value Y−1 is within the neutral zone, but the lever command value X has passed the neutral zone.

If it is determined in block 410 that the lever command value X is within the neutral zone (±α), the CPU proceeds to block 430. In block 430, the valve command value Y is set to be equal to the lever command value X. In other words, when the valve command value Y−1 (current operation command value) and the lever command value X (current lever input command value) are both within the neutral zone (±α), the valve command value Y is set to be equal to the lever command value X as it is.

If it is determined in block 410 that the lever command value X has exceeded the neutral zone (±α), the CPU proceeds to block 420. In block 420, the sign of the lever command value X, i.e., the direction in which the control lever 4*a* is manipulated, is determined. If the lever command value X is not less than 0, the CPU proceeds to block 450 where the valve command value Y=α is set. If it is determined in block 420 that the lever command value X is on the negative (−) side, the CPU proceeds to block 440 where the valve command value Y=−α is set. In other words, when the valve command value Y−1 (current operation command value) is within the neutral zone, but the lever command value X (current lever input command value) has passed the neutral zone, the boundary value α or −α is set as the valve command value Y instead of the lever command value X. The processing in block 400 is thus completed, and the CPU proceeds to the processing in block 700.

Figure 6:
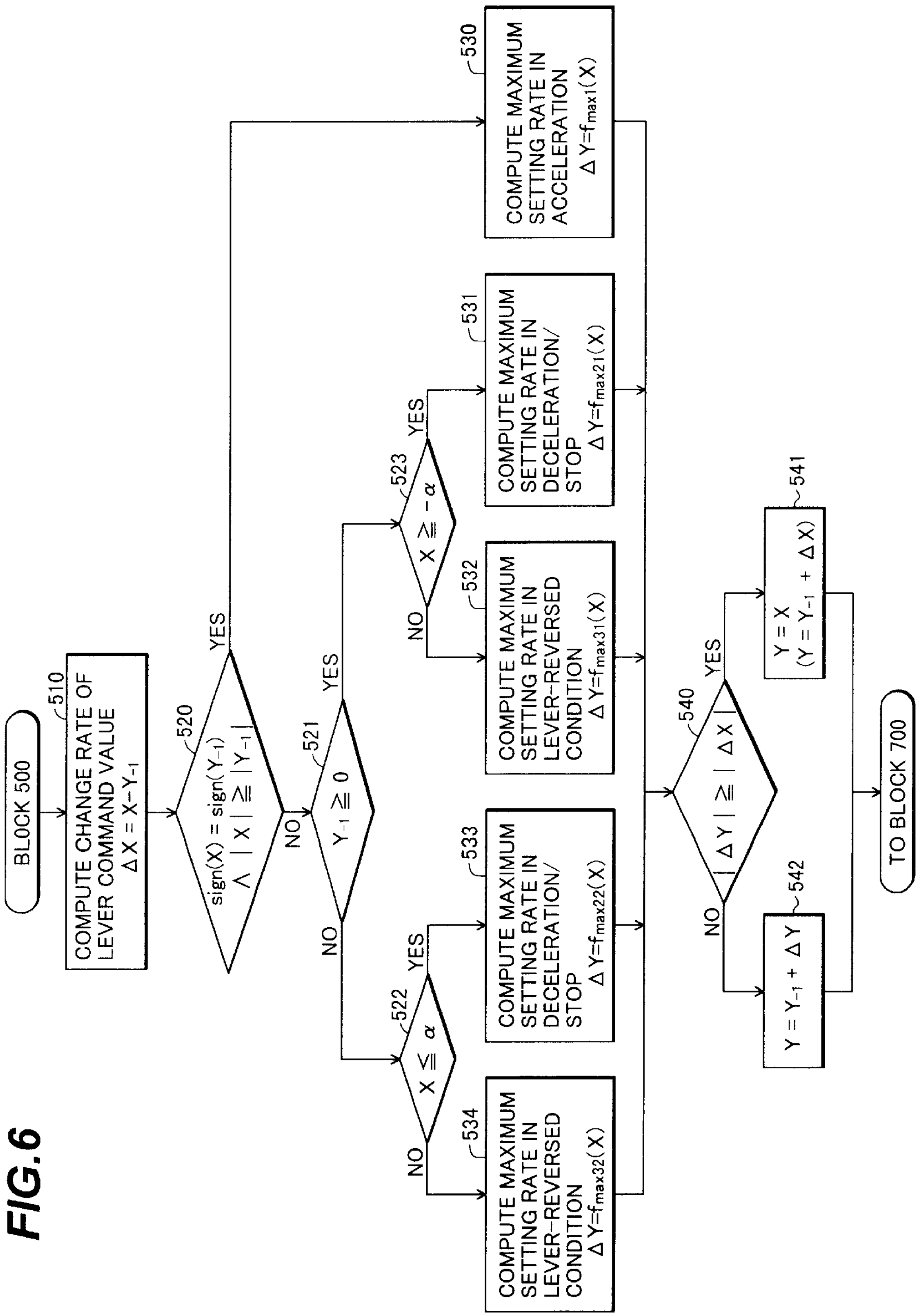
FIG. 6 is a flowchart showing details of "computation of valve command value for driving zone" in the control processing shown in the flowchart of FIG. 3.

Returning to FIG. 3, if it is determined in block 300 that the previously computed valve command value Y−1 (current operation command value) has exceeded the neutral zone, i.e., if $-\alpha<Y-1<\alpha$ a is not satisfied, the processing goes to block 500. In block 500, the valve command value Y for a driving zone is computed. FIG. 6 shows details of block 500.

Referring to FIG. 6, in block 500, the CPU first computes in block 510 a difference between the lever command value X (current lever input command value) and the previously computed valve command value Y−1 (current operation command value), i.e., a change rate ΔX of the lever command value X ($\Delta X=X-Y-1$). In this case, assuming that an execution time of one cycle of the control processing shown in FIG. 3 is Δt, an actual change rate of the lever command value X is expressed by ΔX/Δt. However, because Δt is a substantially constant value and it is convenient to employ a maximum setting rate ΔY (described later), which is to be compared with ΔX, as a change rate in the same cycle, ΔX is directly employed as the change rate of the lever command value X.

Figure 7A:
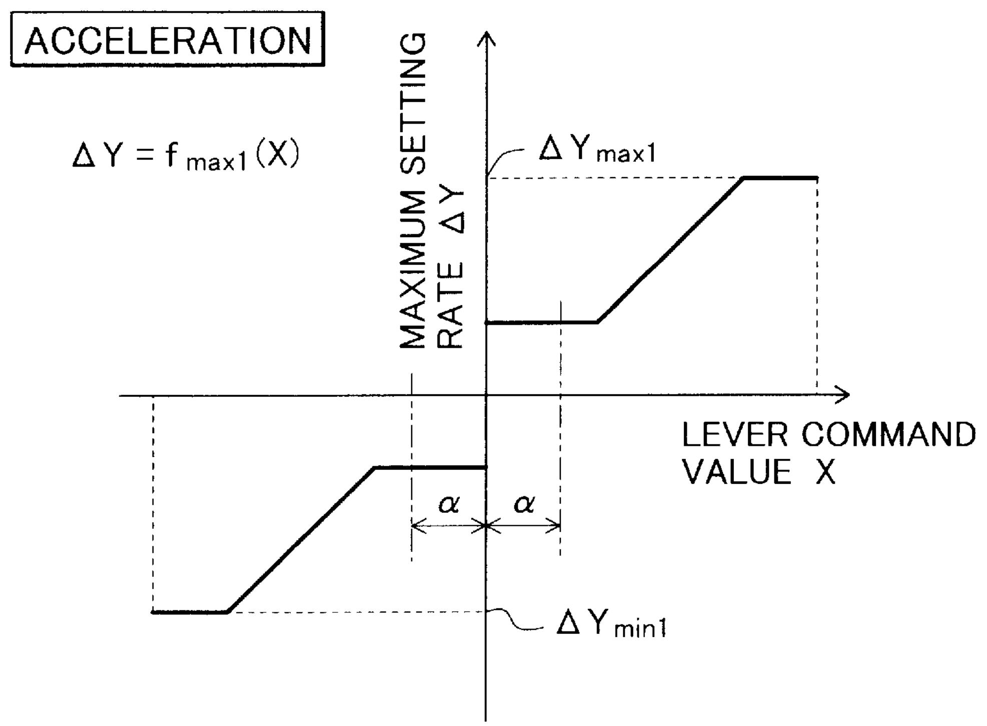
FIG. 7(*a*) is a characteristic graph of a function for determining a maximum setting rate in acceleration, and FIG. 7(*b*) is a characteristic graph of another example of the function.
Figure 7B:
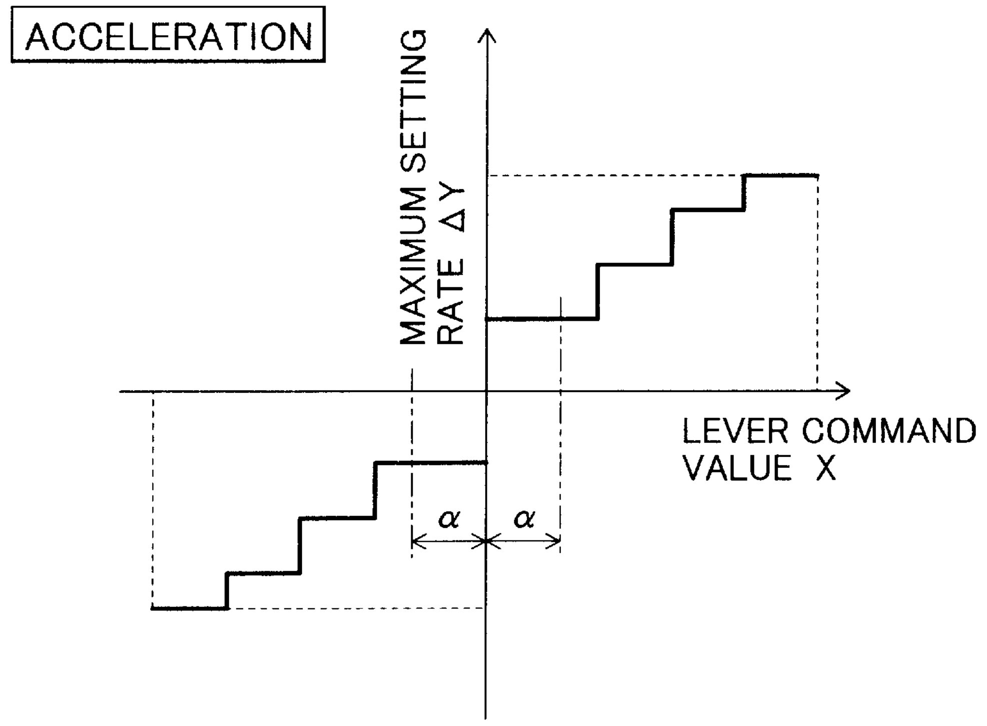

Then, in blocks 520 to 523, the CPU determines in which one of three conditions, i.e., (1) acceleration, (2) deceleration/stop, and (3) lever reversed, the operating status of the hydraulic excavator is. First, in block 520, the operating status is determined as being in acceleration when a comparison between the lever command value X and the previously computed valve command value Y−1 results in that signs of both the values coincide with each other (sign(X)=sign(Y−1)) and an absolute value of the lever command value X is larger than that of the previously computed valve command value Y−1. If the acceleration condition is determined, the processing goes to block 530. In block 530, a maximum setting rate ΔY in acceleration is computed. Herein, ΔY is a function of the lever command value X and is derived, for example, by storing a function (ΔY=fmax1(X)), shown in FIG. 7(*a*), in the form of a table in the ROM memory 54 of the control unit 5, and then reading corresponding ΔY by referring to the lever command value X in the table. Any other suitable method, such as storing a function formula and putting the lever command value X in the formula to calculate ΔY, is also usable. At this time, from the viewpoint of providing a better operation feeling, the relationship between the lever command value X and the maximum setting rate ΔY is preferably set such that, as shown in FIG. 7(*a*), the absolute value of the maximum setting rate ΔY is increased as the absolute value of the lever command value X, i.e., the lever shift amount, increases. Additionally, the relationship between both the values may be set such that, as shown in FIG. 7(*b*), |ΔY| is gradually increased in a stepwise manner as |X| increases.

Figure 8:
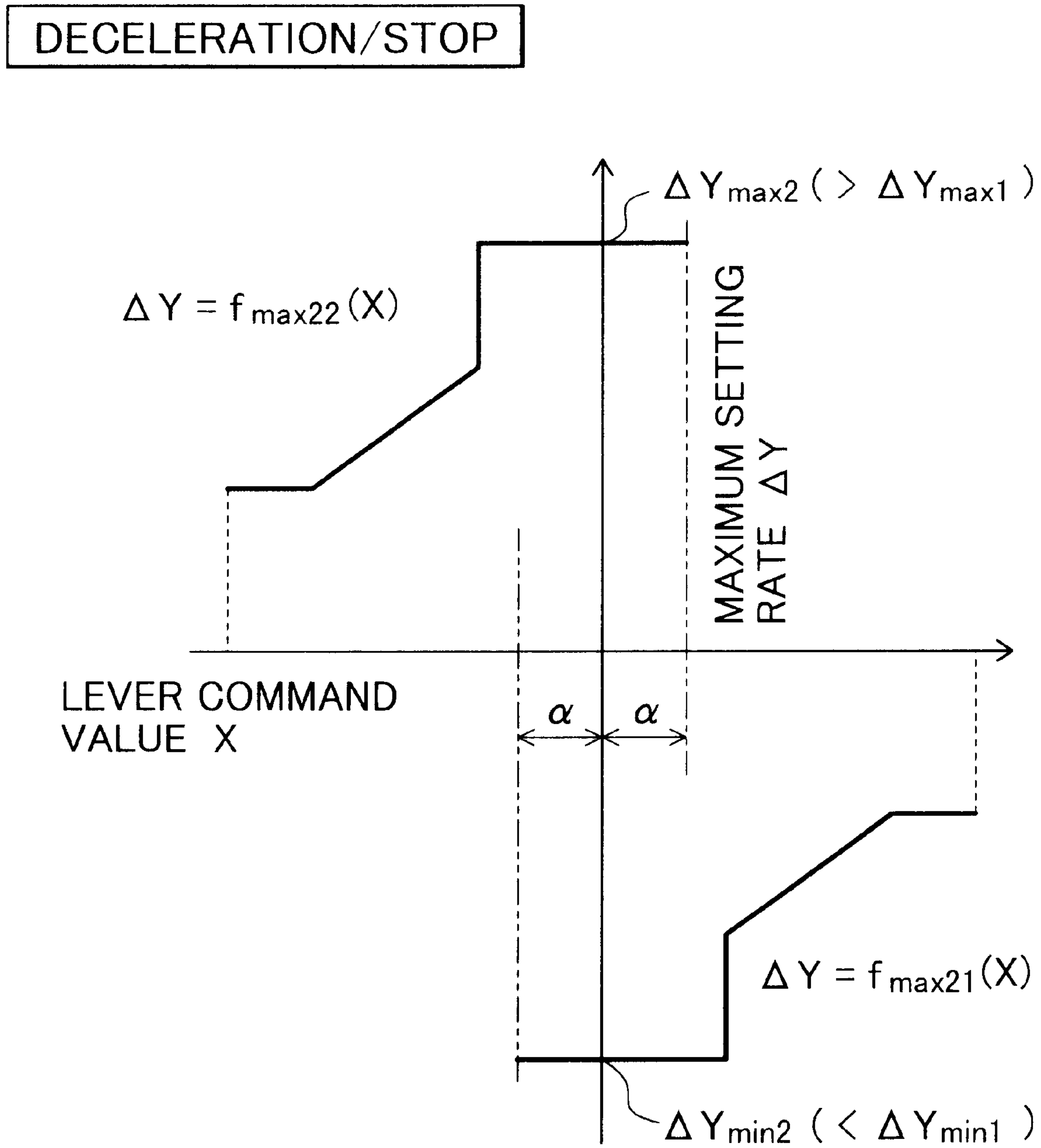
FIG. 8 is a characteristic graph of a function for determining a maximum setting rate in deceleration/stop.

If the operating status is determined in block 520 as being not in acceleration, the processing goes to block 521. In block 521, the current moving direction of the actuator is determined based on the sign of the previously computed valve command value Y−1 (current operation command value). If the previously computed valve command value Y−1 is determined as being positive (+) ($Y-1 \geqq 0$), the processing goes to block 523. In block 523, the direction in which the control lever 4*a* is manipulated is determined from whether the lever command value X is on the positive (+) side with respect to the neutral zone ($X \geqq -\alpha$). If the lever command value X is determined as being on the positive (+) side, the processing goes to block 531. In block 531, a maximum setting rate ΔY in deceleration/stop is computed. Herein, ΔY is a function of the lever command value X and, as with the above case of using the function fmax1, it is derived, for example, by storing a function (ΔY=fmax21(X)), shown in FIG. 8, in the form of a table in the ROM memory 54 of the control unit 5, and then reading corresponding ΔY by referring to the lever command value X in the table. Further, as with the above case, any other suitable method, such as storing a function formula and putting the lever command value X in the formula to calculate ΔY, is also usable. At this time, from the viewpoint of providing a better operation feeling, the relationship between the lever command value X and the maximum setting rate ΔY is preferably set such that, as shown in FIG. 8, the absolute value of the maximum setting rate ΔY is increased as the absolute value of the lever command value X, i.e., the lever shift amount, decreases and the lever command value X approaches the neutral zone. Additionally, as with the above case, the relationship between both the values may be set such that ΔY is increased in a stepwise manner as |X| decreases. Moreover, a minimum value ΔYmin2 of the maximum setting rate in this case is preferably set to satisfy ΔYmin2<ΔYmin1 with respect to a minimum value ΔYmin1 of the maximum setting rate in acceleration so that the actuator is quickly brought into a standstill when it is to be stopped.

Figure 9:
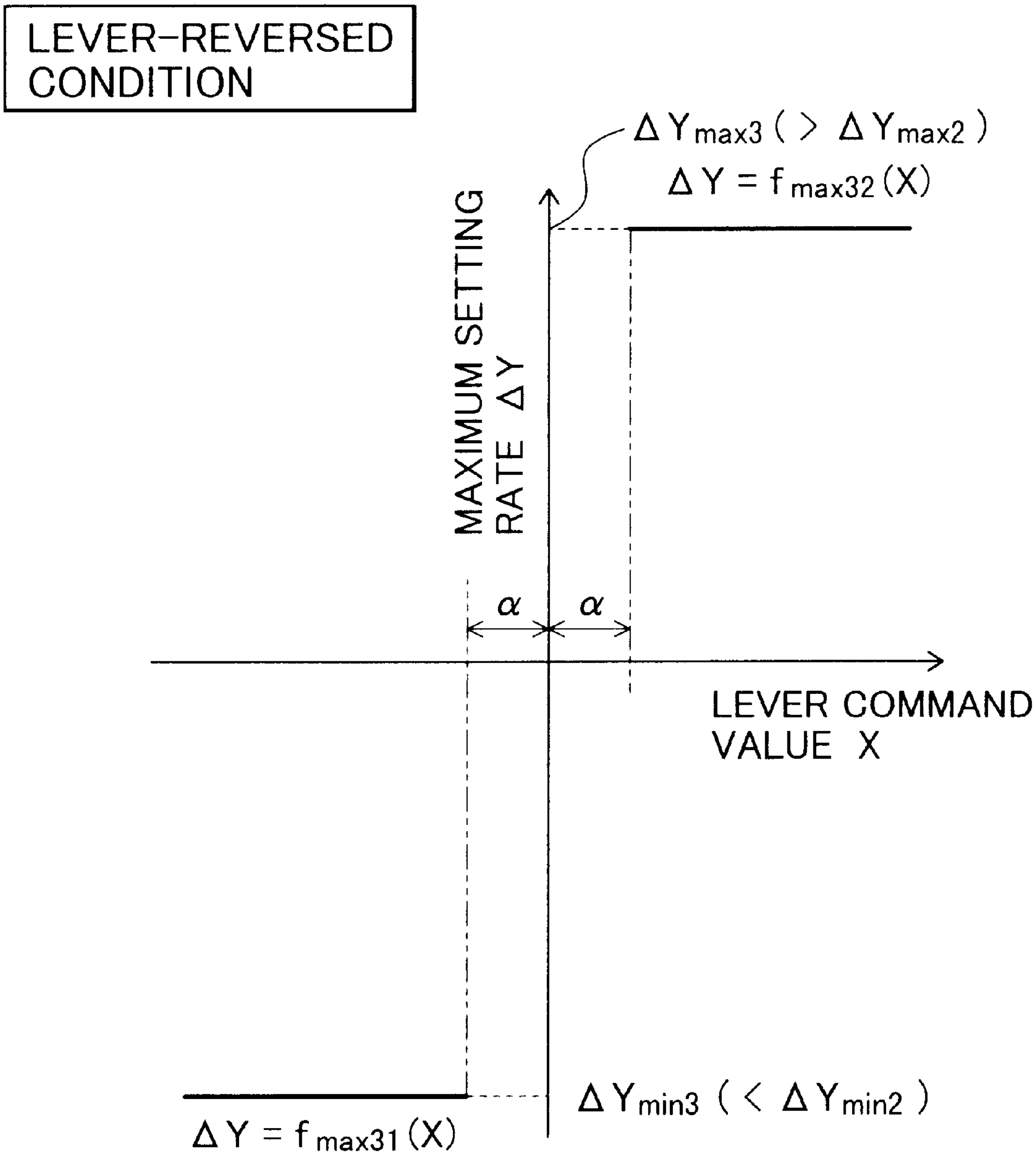
FIG. 9 is a characteristic graph of a function for determining a maximum setting rate in the lever-reversed condition.

If the lever command value X is determined in block 523 as being on the negative (−) side ($X<-\alpha$), i.e., if the operating status is determined as being in the lever-reversed condition, the processing goes to block 532. In block 532, a maximum setting rate ΔY in the lever-reversed condition is computed. Herein, ΔY is a function of the lever command value X and, as with the above case of using the function fmax1, it is derived, for example, by storing a function (ΔY=fmax31(X)), shown in FIG. 9, in the form of a table in the ROM memory 54 of the control unit 5, and then reading corresponding ΔY by referring to the lever command value X in the table. Any other suitable method, such as storing a function formula and putting the lever command value X in the formula to calculate ΔY, is also usable. At this time, from the viewpoint of providing a better operation feeling, the relationship between the lever command value X and the maximum setting rate ΔY is preferably set such that, as shown in FIG. 9, the maximum setting rate ΔY has a constant large value regardless of the magnitude of the lever command value X. Alternatively, the relationship between both the values may be set such that ΔY is changed gradually or stepwisely depending on the value of X. Further, a minimum value ΔYmin3 of the maximum setting rate in this case is preferably set to satisfy ΔYmin3<ΔYmin2 with respect to the minimum value ΔYmin2 of the maximum setting rate in deceleration/stop so that the moving direction of the actuator can be reversed with a good response in the lever-reversed operation.

If the previously computed valve command value Y−1 is determined in block 521 as being negative (−), the processing goes to block 522. In block 522, the direction in which the control lever 4*a* is manipulated is determined from whether the lever command value X is on the negative (−) side with respect to the neutral zone (X≦α). If the lever command value X is determined as being on the negative (−) side, the processing goes to block 533. In block 533, a maximum setting rate ΔY in deceleration/stop is computed. Herein, ΔY is calculated by putting the lever command value X in a function (ΔY=fmax22(X)) shown in FIG. 8. As with the above case of using fmax21, from the viewpoint of providing a better operation feeling, the relationship between the lever command value X and the maximum setting rate ΔY is preferably set such that, as shown in FIG. 8, the absolute value of the maximum setting rate ΔY is increased as the absolute value of the lever command value X, i.e., the lever shift amount, decreases and the lever command value X approaches the neutral zone. However, the relationship between both the values is not always required to be a function expressed by fmax21 but having an opposite sign, and may be set to optimum one from the viewpoint of providing a better operation feeling. Additionally, as with the above case of using the function ΔY=fmax21(X), the function ΔY=fmax22(X) may be provided in the form of a table or a calculation formula, and may be set so as to provide a stepwise relationship between |X| and ΔY. Moreover, a maximum value ΔYmax2 of the maximum setting rate in this case is preferably set to satisfy ΔYmax2>ΔYmax1 with respect to a maximum value ΔYmax1 of the maximum setting rate in acceleration so that the actuator is quickly brought into a standstill when it is to be stopped.

If the lever command value X is determined in block 522 as being on the positive (+) side (X>α), i.e., if the operating status is determined as being in the lever-reversed condition, the processing goes to block 534. In block 534, a maximum setting rate ΔY in the lever-reversed condition is computed. Herein, ΔY is a function of the lever command value X and is calculated by putting the lever command value X in a function (ΔY=fmax32(X)) shown in FIG. 9. At this time, from the viewpoint of providing a better operation feeling,. the relationship expressed by ΔY=fmax32(X) is preferably set such that, as shown in FIG. 9, the maximum setting rate ΔY has a constant large value regardless of the magnitude of the lever command value X. However, the relationship between both the values is not always required to be a function expressed by fmax31 but having an opposite sign, and may be set to optimum one from the viewpoint of providing a better operation feeling. That relationship may be set such that ΔY is changed gradually or stepwisely depending on the value of X. Additionally, as with the above case of using fmax31, ΔY may be computed using either a table or a calculation formula. Further, a maximum value ΔYmax3 of the maximum setting rate in this case is preferably set to satisfy ΔYmax3>ΔYmax2 with respect to the maximum value ΔYmax2 of the maximum setting rate in deceleration/stop so that the moving direction of the actuator can be reversed with a good response in the lever-reversed operation.

Then, after computing the maximum setting rate ΔY corresponding to the operating status in blocks 520 to 534 as described above, the processing goes to block 540.

In blocks 540 to 542, the valve command value Y is computed using the change rate ΔX of the lever command value X or the maximum setting rate ΔY that are obtained in the above processing. First, in block 540, the lever command value change rate ΔX is compared with the maximum setting rate ΔY. If |ΔY|≧|ΔX| is satisfied, it is judged that the lever manipulation is not quick, and the processing goes to block 541. In block 541, the valve command value Y=the lever command value X is set. On the other hand, if |ΔY|<|ΔX| is satisfied in block 540, it is judged that the lever is quickly manipulated, and the valve command value is computed in block 542 based on Y=Y−1+ΔY for preventing abrupt change of the valve command value Y. The processing in block 500 is thus completed, and the CPU proceeds to the processing in block 700.

Returning to FIG. 3, in block 700, the previously computed valve command value Y−1 is replaced by the current valve command value Y computed in block 400 or 500 (Y−1=Y) for computation in the next cycle.

Subsequently, in block 800, the valve command value Y is converted into valve drive signals for the solenoid proportional valves 3*a*, 3*b*, and the valve drive signals are outputted to control the flow control valve 3.

One example of the operation in accordance with the control procedures described above in connection with FIGS. 3 to 9 will be described below with reference to time charts of FIGS. 10 to 12. In each of FIGS. 10 to 12, the block numbers denoted in the flowcharts of FIGS. 5 and 6 are put along the time base at a point where the block denoted by each number develops its function.

Figure 10A:
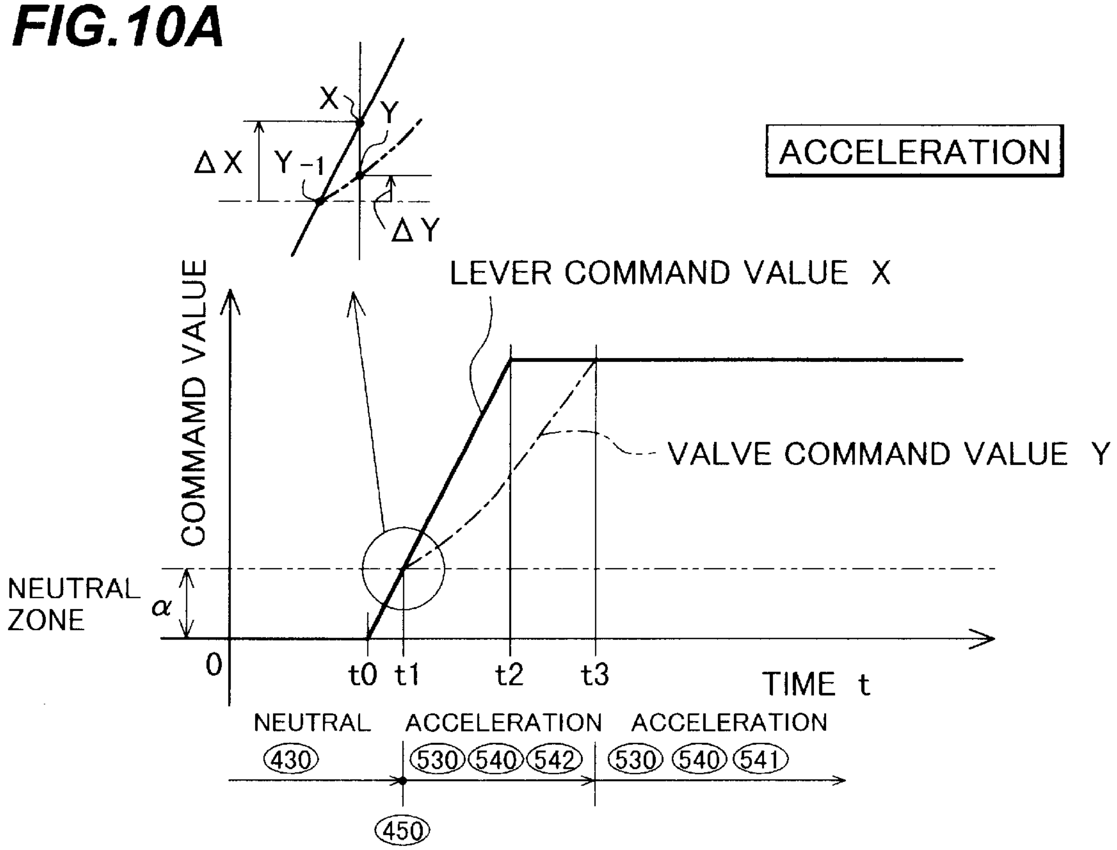
FIG. 10 is a time chart showing one example of the operation in acceleration.
Figure 10B:
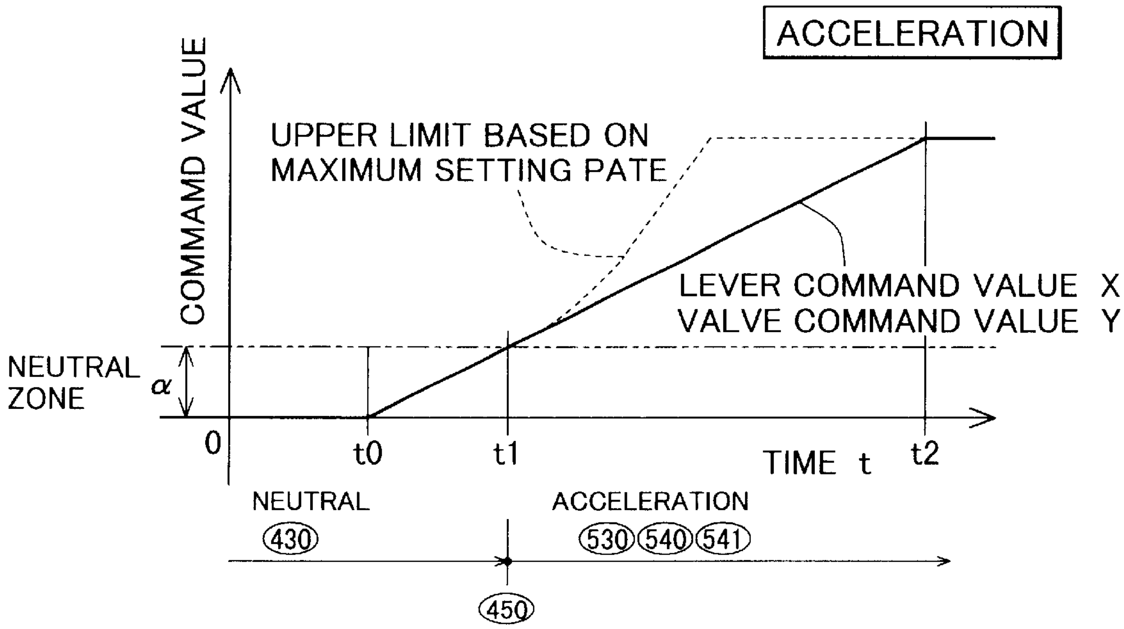

First, FIGS. 10(*a*) and 10(*b*) show time charts in the case manipulating the control lever 4*a* to the positive (+) side from a neutral condition. In the time charts, a solid line represents a signal from the control lever 4*a* (lever command value X), and a one-dot-chain line represents the valve command value Y obtained through the control processing in this embodiment. When the control lever 4*a* is manipulated starting from the time t0 to a full stroke at the time t2, the condition of the valve command value Y=the lever command value X is maintained by the processing in block 430 within block 400 "computation of valve command value for neutral dead zone" during a time period t0–t1 in which the lever command value X is within the neutral zone (−α≦X≦α) and the valve command value Y−1 is also within the neutral zone (−α<Y−1<α). When the lever command value X exceeds the neutral zone (X>α), the valve command value Y is set to Y=α, whereupon the determination in block 300 "within neutral dead zone −α<Y−1<α", shown in FIG. 3, is negated immediately and block 500 "computation of valve command value for driving zone" is executed from the time t1. At this time, since the conditions (sign(X)=sign(Y−1) and |X|≧|Y−1|) of block 520 within block 500 are satisfied, block 530 "computation of maximum setting rate in acceleration" is executed. Then, after the time t1, the lever command value change rate ΔX is compared with the maximum setting rate ΔY, and the valve command value Y is increased in accordance with one of both the rates having a smaller absolute value.

FIG. 10(*a*) represents the case of manipulating the control lever 4*a* quickly, i.e., the situation where |ΔY|<|ΔX| is satisfied. In this case, the processing of block 542 within block 500 is executed and, as indicated by the one-dot-chain line, the valve command value Y is increased in accordance with the value of ΔY after the time t1. Even with the control lever 4*a* manipulated quickly, therefore, the change rate of the valve command value is held to be not larger than ΔY, thus enabling the actuator 2 to start up (accelerate) without any shock at a speed at which the operator feels no delay in the operation. Also, since ΔY is a function of the lever command value X, an optimum maximum change rate can be set depending on the lever command value X (value of the operational signal), and an appropriate feeling in acceleration corresponding to the input amount upon shift of the control lever 4*a* can be provided. Further, since the maximum setting rate is not restrained based on the maximum change rate while the valve command value Y−1 is within the neutral zone, no delay occurs in increase of the flow rate through the control valve with respect to the lever command value X.

FIG. 10(*b*) represents the case of manipulating the control lever 4*a* moderately. In this case, since the change rate ΔX of the lever signal upon manipulation of the control lever is smaller than the maximum setting rate ΔY (|ΔY|≧|ΔX|), the processing of block 541 within block 500 is executed and, as shown in FIG. 10(*b*), the valve command value Y coincides with the lever command value X. The operator can therefore start up (accelerate) the actuator 2 with a desired feeling in acceleration.

Figure 11:
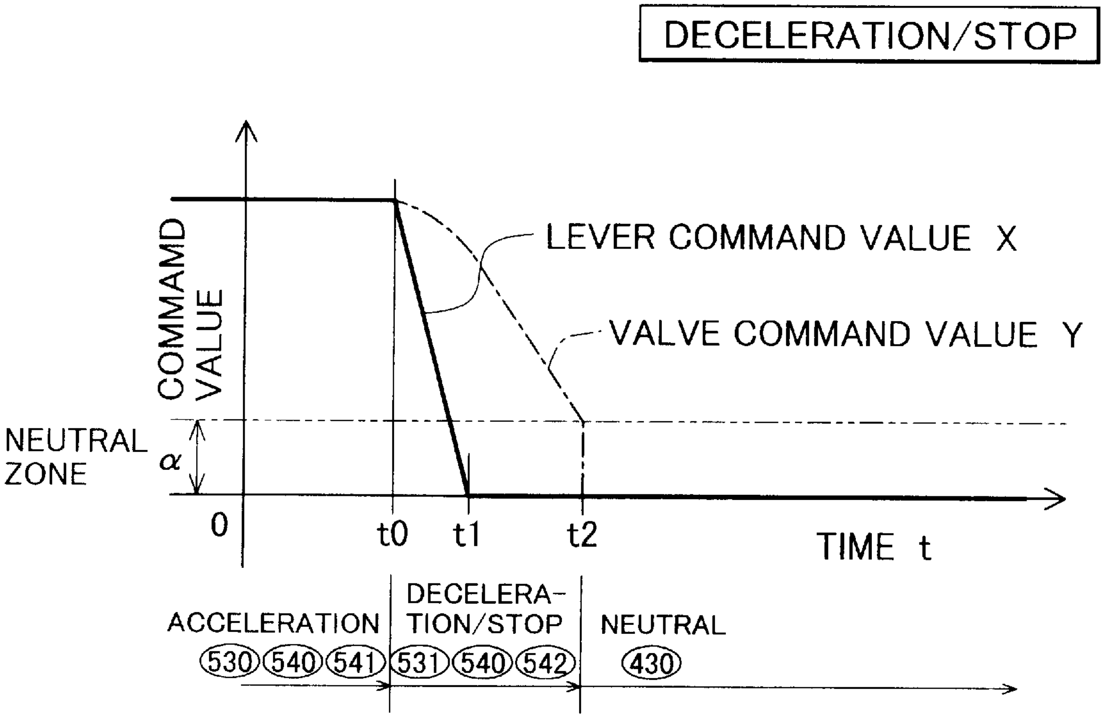
FIG. 11 is a time chart showing one example of the operation in deceleration/stop.

FIG. 11 represents the case of returning the control lever 4*a* quickly from the maximum shift position to the neutral position for stopping the actuator. When the control lever 4*a* is quickly returned during the time period t0–t1, |X|<|Y−1| is satisfied and the conditions (sign(X)=sign(Y−1) and |X|≧|Y−1|) of block 520 within block 500 are negated, whereby the operating status is determined as being in deceleration/stop as indicated by block 531 within block 500. Therefore, the maximum setting rate is computed in accordance with the function ΔY=fmax21(X) shown in FIG. 8. Further, in this case, since the lever command value X is returned from a maximum value to 0 during the time period from t0 to t1, the condition is determined as satisfying |ΔY|<|ΔX| and the processing of block 542 within block 500 is executed, whereby the valve command value Y is decreased in accordance with the value of ΔY as indicated by a one-dot-chain line. The same condition continues after the time t1, and the valve command value Y is returned to the boundary value (Y=α) on the positive (+) side of the neutral zone at the time t2. Upon reaching Y=α, the determination in block 300 "within neutral dead zone −α<Y−1<α", shown in FIG. 3, is affirmed immediately, and the processing goes to the "computation of valve command value for neutral dead zone" in block 400. At this time, because of X=0, the processing of block 430 in FIG. 5 is executed and the system transits to a state of Y=X=0 at once. Thus, in the operation for stop, the machine body is brought into a standstill in accordance with such a characteristic (Y=fmax21(X)) of the maximum setting rate ΔY as neither imposing shocks on the machine body nor making the machine body stop too slowly even with the control lever 4*a* returned quickly.

Figure 12:
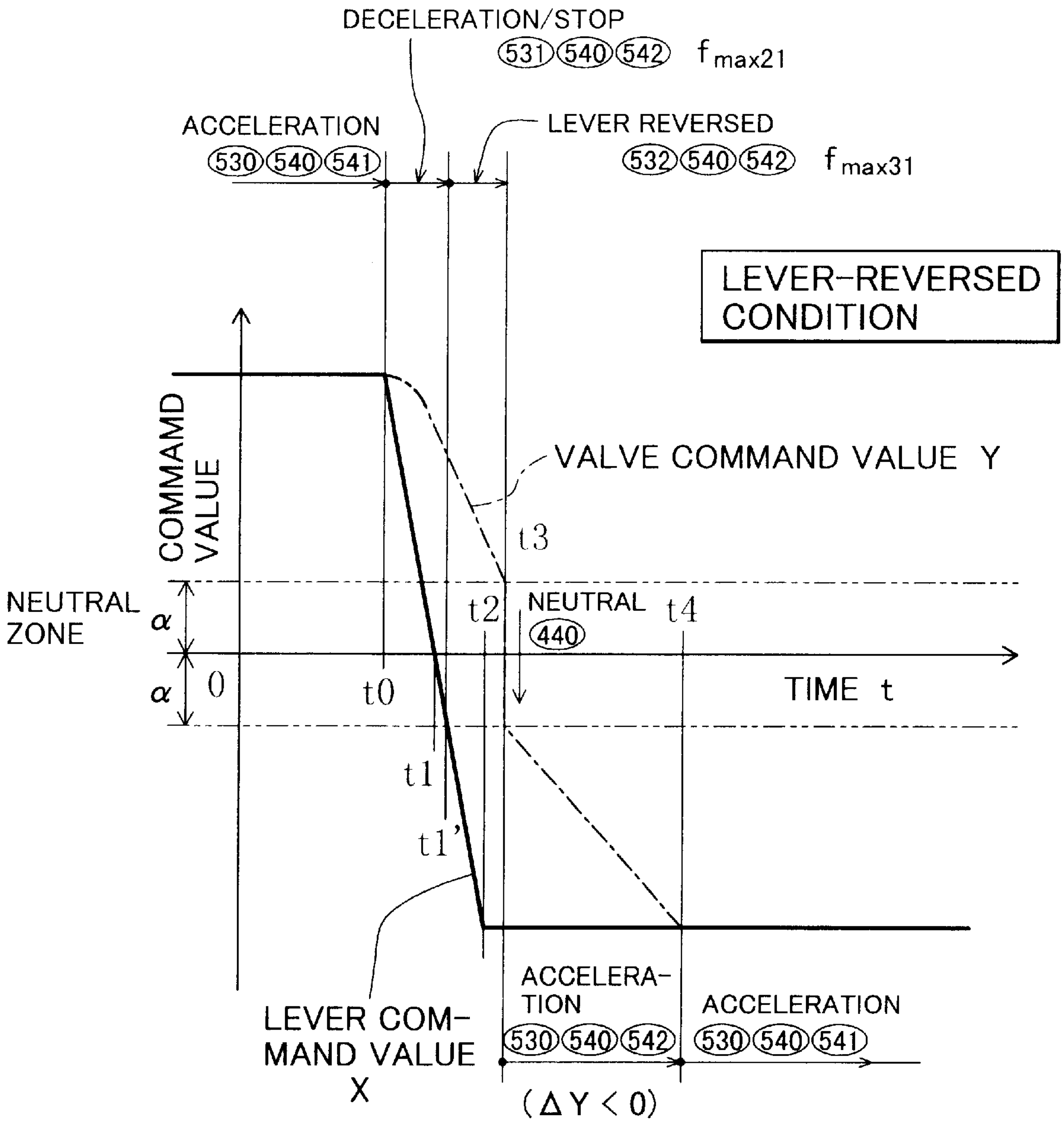
FIG. 12 is a time chart showing one example of the lever-reversed operation.

Next, FIG. 12 represents the case of manipulating the control lever 4*a* quickly from a maximum value on the positive (+) side to a minimum value (maximum absolute value) on the negative (−) side during a time period from t0 to t2 (referred to as a lever-reversed operation). In FIG. 12, during a time period from t0 to t1', the "computation of maximum setting rate in deceleration/stop" of block 531 within block 500, shown in FIG. 6, is executed. Therefore, change of the valve command value Y is restrained based on the maximum setting rate ΔY according to the function ΔY=fmax21(X) shown in FIG. 8, and the valve command value Y is decreased in accordance with the value of ΔY through the processing of block 542 within block 500. When the lever command value X reaches the boundary value −α on the negative (−) side of the neutral zone at the time t1' (X=−α), the "computation of maximum setting rate in lever-reversed condition" of block 532 is executed after that. Thus, change of the valve command value Y is restrained based on the maximum setting rate ΔY according to the function ΔY=fmax31(X) shown in FIG. 9, and the valve command value Y is similarly decreased in accordance with the value of ΔY resulting from the above function.

When the valve command value Y reaches the boundary value α on the positive (+) side of the neutral zone at the time t3 (Y=α), the determination in block 300 "within neutral dead zone −α<Y−1<α", shown in FIG. 3, is affirmed immediately, and the processing goes to the "computation of valve command value for neutral dead zone" in block 400. At this time, because of the lever command value X having already reached the minimum value on the negative (−) side, the processing of block 440 in FIG. 5 is executed and the valve command value Y=−α is set at once. Thereafter, during a time period from t3 to t4, the "computation of maximum setting rate in acceleration" of block 530, shown in FIG. 6, is executed and the valve command value Y is computed in accordance with the maximum setting rate ΔY given by part of the function ΔY=fmax1(X), shown in FIG. 7(*a*), which corresponds to the lever command value X on the negative (−) side.

Herein, the term "lever-reversed operation" means an operation performed when it is required to quickly change the moving direction of the working device in the case of, e.g., dropping mud from a bucket, bumping a boom against a vertical surface, or avoiding a risk, and a rapid response is demanded until the working device changes the moving direction. After the moving direction of the working device has changed and become coincident with the operating direction, the operation having such characteristics as being not slow and free from shocks is desired as with ordinary works.

According to this embodiment, as shown in FIG. 12, during the time period from t0 to t1', change of the valve command value Y is restrained based on the maximum setting rate ΔY according to the function ΔY=fmax21(X) for the condition of deceleration/stop, shown in FIG. 8. Then, during the time period from t1' to t3, change of the valve command value Y is restrained based on the maximum setting rate ΔY according to the function ΔY=fmax31(X) for the lever-reversed condition, shown in FIG. 9. The minimum value ΔYmin3 of the maximum setting rate ΔY in the lever-reversed condition is set to satisfy ΔYmin3<ΔYmin2 with respect to the minimum value ΔYmin2 of the maximum setting rate in deceleration/stop so that the moving direction of the working device can be reversed with a good response. Further, when the valve command value Y reaches the boundary value α on the positive (+) side of the neutral zone at the time t3 (Y=α), the valve command value Y=−α is set at once by the processing of block 440 in FIG. 5 so that the valve command value Y is changed in a moment within the neutral zone (±α). After the time t3, the valve command value Y is computed in accordance with the maximum setting rate ΔY given by the function ΔY=fmax1(X) for the condition of acceleration, shown in FIG. 7(*a*). Accordingly, the lever-reversed operation can be performed without causing the operator to feel a pause in the operation in the vicinity of the neutral position where the moving direction of the working device becomes coincident with the operating direction. Further, after the moving direction of the working device has become coincident with the operating direction, the operation having such characteristics as being not slow and free from shocks is realized as with ordinary works.

Figure 13:
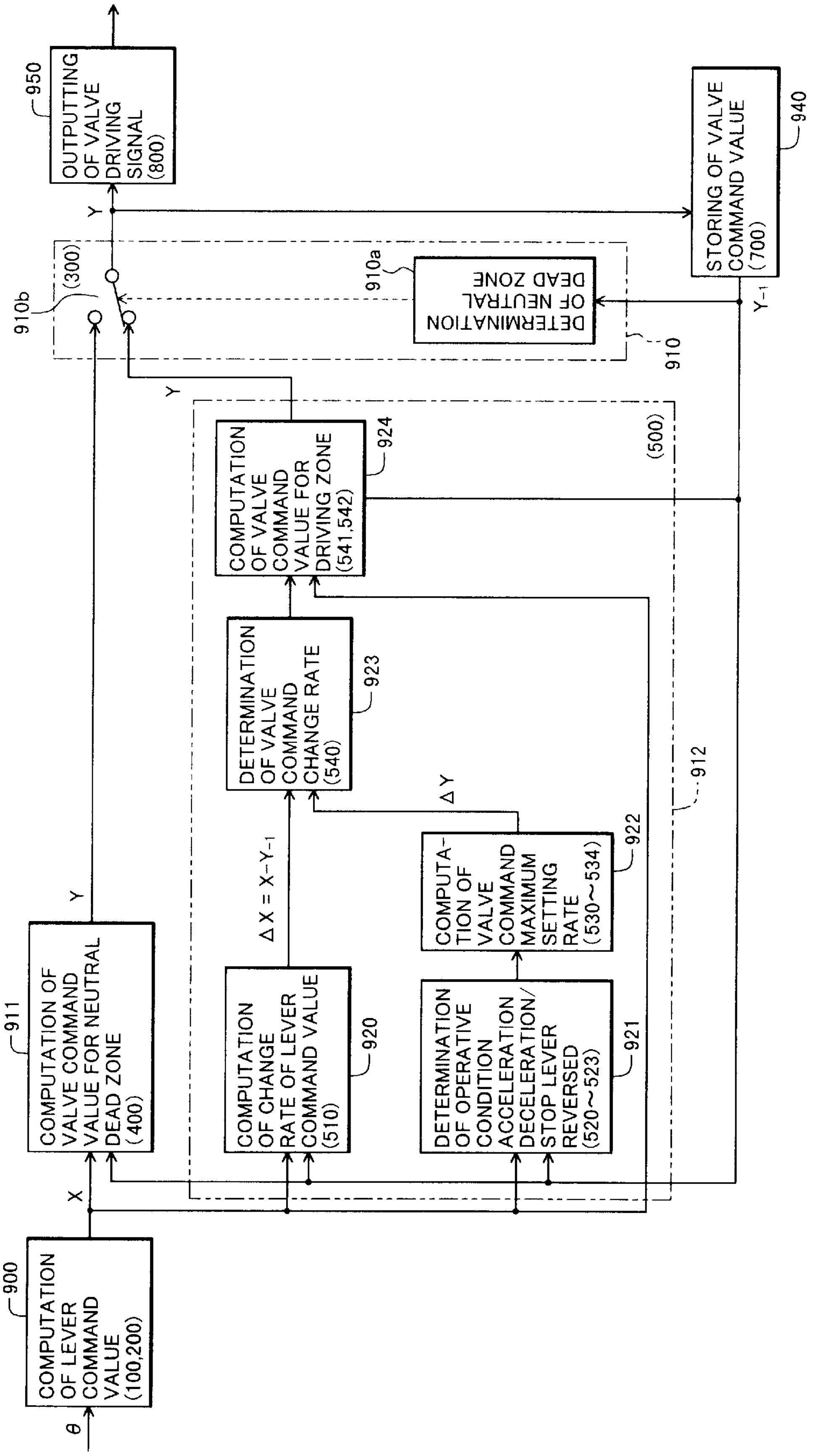
FIG. 13 is a functional block diagram of the control processing shown in the flowcharts of FIGS. 3, 5 and 6.

FIG. 13 is a functional block diagram for the control processing in the control unit 5. In FIG. 13, block 900 "computation of lever command value" corresponds to blocks 100, 200 in FIG. 3. Block 910 indicated by a two-dot-chain line corresponds to block 300 in FIG. 3, and comprises block 910*a* "determination of neutral dead zone" and a processing changeover switch 910*b*. Block 911 "computation of valve command value for neutral dead zone" corresponds to block 400 in FIG. 3. Block 912 indicated by a two-dot-chain line corresponds to block 500 in FIG. 3. Within block 912, block 920 "computation of change rate of lever command value" corresponds to block 510 in FIG. 6; block 921 "determination of operating status" corresponds to blocks 520–523 in FIG. 6; block 922 "computation of valve command maximum setting rate" corresponds to blocks 530–534 in FIG. 6; block 923 "determination of valve command change rate" corresponds to block 540 in FIG. 6; and block 924 "computation of valve command value for driving zone" corresponds to blocks 541, 542 in FIG. 6. Furthermore, block 940 "storing of valve command value" corresponds to block 700 in FIG. 3, and block 950 corresponds to block 800 in FIG. 3.

Moreover, block 921 in FIG. 13 corresponds to first determining means for determining the operating status of a construction machine based on an operational signal. Block 922 constitutes first processing means for setting therein an optimum maximum change rate of a control signal for the flow control valve beforehand for each operating status of the construction machine, determining the optimum maximum change rate adapted for the operating status of the construction machine at that time based on a determination result of the first determining means, and setting the determined optimum maximum change rate as a maximum change rate of the control signal for the flow control valve.

In addition, block 910 (block 910*a* and processing changeover switch 910*b*) in FIG. 13 constitutes second determining means for determining whether a value of the control signal for the flow control valve is within the neutral zone. Block 911 constitutes second processing means for computing the control signal in accordance with the operational signal when the value of the control signal for the flow control valve is within the neutral zone of the flow control valve, instead of executing the processing to restrain the change rate of the control signal in accordance with the maximum change rate.

With this embodiment, as described above, in a system of controlling the flow control valve 3 with an electrical operational signal to control the operation of the actuator 2, the flow control valve can be controlled at an optimum maximum change rate in any operating status of acceleration, deceleration/stop, and lever-reversed condition with resulting characteristics cited below:

(a) in acceleration/deceleration, the machine undergoes a less shock and an operator feels no delay in the operation even with the operator manipulating the control lever 4*a* quickly;

(b) in moderate acceleration/deceleration, the actuator is moved as intended by the operator;

(c) in operation for stop, the machine undergoes a less shock and the operator feels no delay in motion toward stop even with the operator manipulating the control lever 4*a* quickly; and (d) in quick lever reversing, the actuator 2 can be rapidly reversed in motion, the machine undergoes a less shock around a point in time at which the moving speed of the actuator 2 is reversed, and the lever-reversed operation can be performed without causing the operator to feel neither a delay in the operation nor a pause in the operation in the vicinity of the neutral position. As a result, advantages of higher working efficiency and more positive safety can be achieved.

Further, since the maximum change rate is variable depending on the position of the control lever 4*a* (value of the operational signal), the maximum change rate of the flow control valve 3 can be controlled as desired with proper manipulation of the control lever 4*a*, and an appropriate feeling in acceleration and deceleration corresponding to the input amount upon shift of the control lever 4*a* can be provided. For example, the operation undergoing an even lesser shock can be performed by stopping the control lever 4*a* for a while just before a point in time at which the operational signal becomes 0 (i.e., a lever position just before a point in time at which the maximum change rate reaches ΔYmin2 in FIG. 8) when the control lever 4*a* is returned, thereby slightly suppressing the maximum change rate, and then finally returning the control lever 4*a* to 0.

Figure 14:
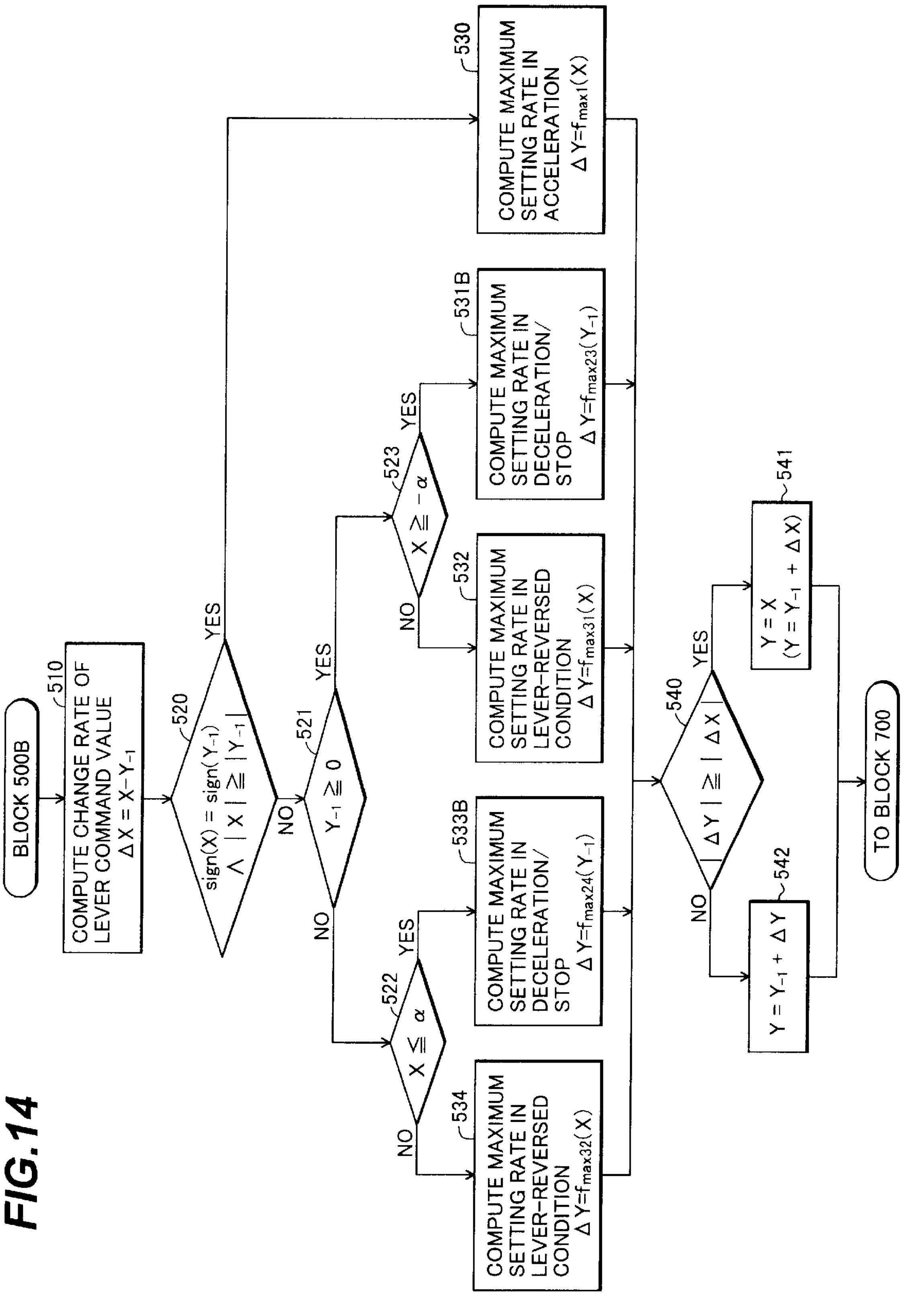
FIG. 14 is a flowchart, similar to FIG. 6, showing details of "computation of valve command value for driving zone" in a hydraulic circuit control system for a construction machine according to a second embodiment of the present invention.

FIG. 14 shows a second embodiment of the present invention. This second embodiment differs from the above first embodiment in that block 500 shown in FIG. 3 is replaced by block 500B shown in FIG. 14. In FIG. 14, sub-blocks having the same functions as those of block 500 detailed in FIG. 6 are denoted by the same numerals.

Blocks 531B, 533B in FIG. 14 have different functions from blocks 531, 533 of FIG. 6 in the above first embodiment. Blocks 531B, 533B are each block for "computation of maximum setting rate in deceleration/stop" executed when the operating status is in the condition of deceleration or stop. In blocks 531B and 533B, the maximum setting rates ΔY are derived as functions of the previously outputted valve command value Y−1, i.e., ΔY=fmax23(Y−1) and ΔY=fmax24(Y−1), respectively.

Figure 15:
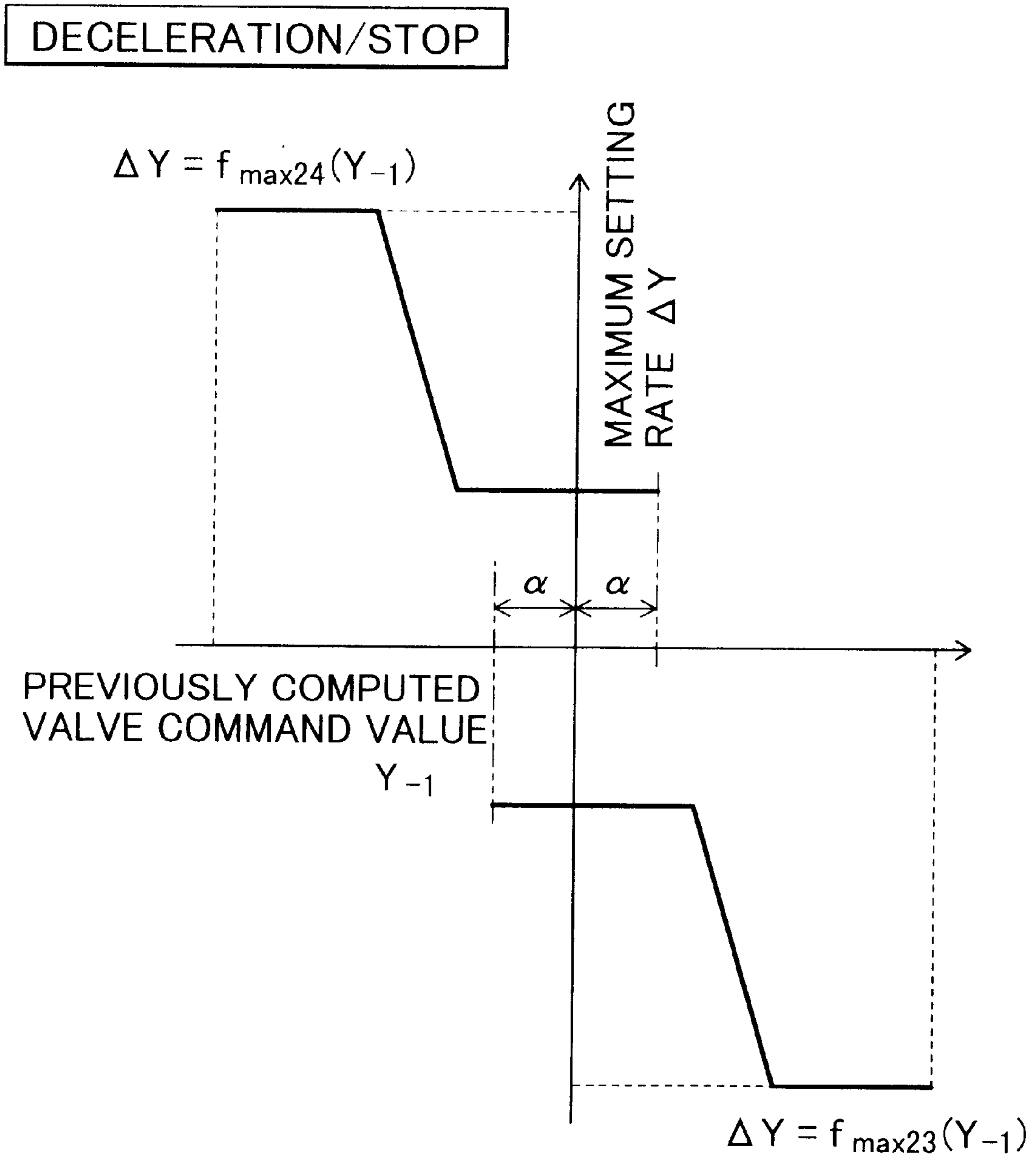
FIG. 15 is a characteristic graph of a function for determining a maximum setting rate in deceleration/stop in the second embodiment.

The functions ΔY=fmax23(Y−1) and ΔY=fmax24(Y−1) are shown in FIG. 15. Herein, the maximum setting rate is set such that the absolute value |ΔY| of the maximum setting rate is reduced as the previously computed valve command value Y−1 returns toward the neutral.

Figure 16:
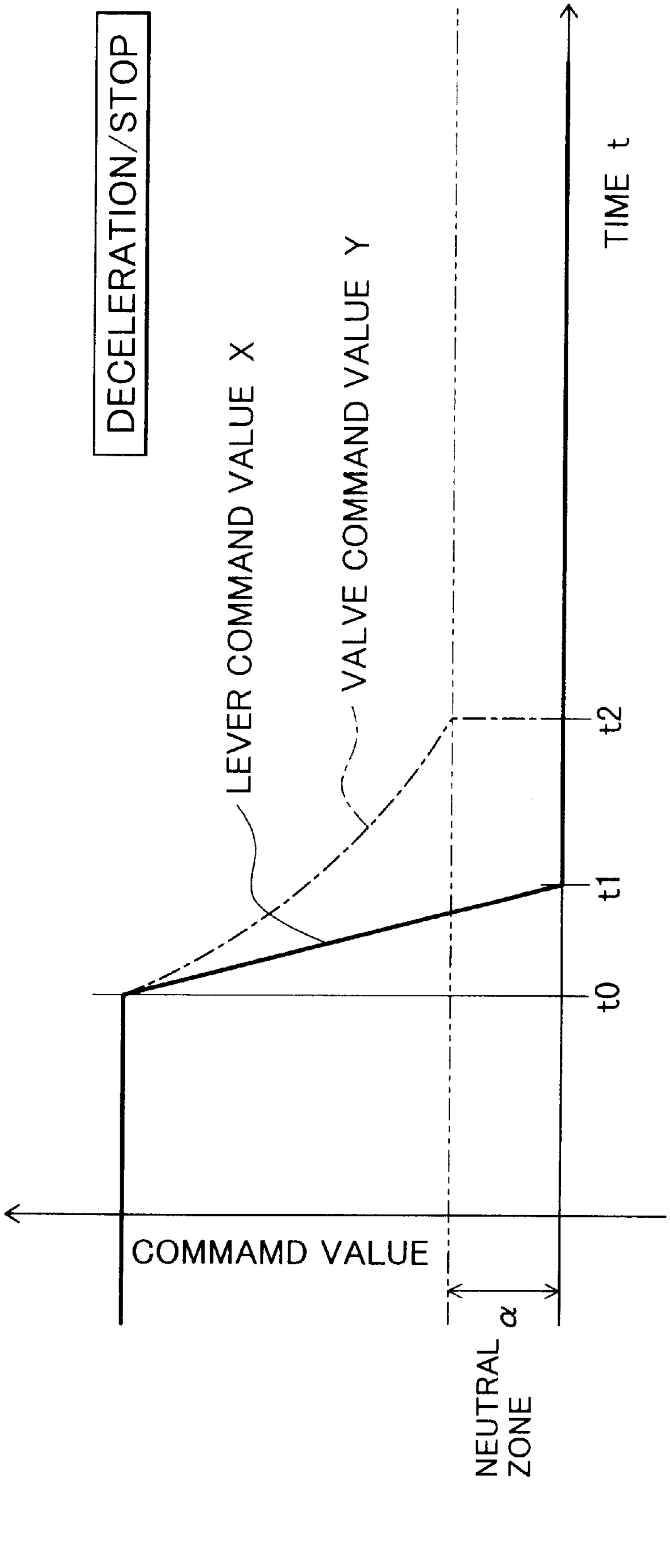
FIG. 16 is a time chart showing one example of the operation in deceleration/stop in the second embodiment.

FIG. 16 shows an actual operation implemented using one of those functions. In FIG. 16, when the control lever 4*a* is quickly returned during a time period t0–t1, the maximum setting rate ΔY is computed based on the function ΔY=fmax23(Y−1) shown in FIG. 15. As indicated by a one-dot-chain line in the time period t0–t2 in FIG. 16, therefore, the valve command value Y is changed at a rate that decreases as it returns toward the neural zone. As a result, even with the control lever manipulated quickly, the working device is not only slowed down just before stopping so as to alleviate a shock, but also brought into a standstill without causing the operator to feel a delay in motion because an initial value of the maximum setting rate is relatively large.

Industrial Applicability

According to the present invention, in a system of controlling a flow control valve with an electrical operational signal to control the operation of an actuator, since an optimum maximum setting rate is computed based on determination of the operating status, the flow control valve can be controlled at the optimum maximum change rate in any operating status of acceleration, deceleration/stop, and lever-reversed condition with resulting characteristics cited below:

(a) in acceleration/deceleration, a machine undergoes a less shock and an operator feels no delay in the operation even with the operator manipulating a control lever quickly;

(b) in moderate acceleration/deceleration, the actuator is moved as intended by the operator;

(c) in operation for stop, the machine undergoes a less shock and the operator feels no delay in the motion toward stop even with the operator manipulating the control lever quickly; and (d) in quick lever reversing, the actuator can be rapidly reversed in motion, whereby working efficiency and safety are improved.

Also, since the optimum maximum change rate is set depending on a value of an operational signal, an appropriate feeling in acceleration and deceleration corresponding to the input amount upon shift of the control lever can be provided.

Further, according to the present invention, in the lever-reversed operation, the machine undergoes a less shock around a point in time at which the moving speed of the actuator is reversed, and the operation can be performed without causing the operator to feel neither a delay in the operation nor a pause in the operation in the vicinity of the neutral position.

In addition, according to the present invention, since the optimum maximum change rate is set depending both the value of the operational signal and a previously outputted control signal, an appropriate feeling in acceleration and deceleration corresponding to the input amount upon shift of the control lever can be provided.

What is claimed is:

1. A hydraulic circuit control system for a construction machine comprising a hydraulic actuator (2) for driving a working device (6*a*), a hydraulic pump (1) driven by a prime mover and producing a pressurized hydraulic fluid, a flow control valve (3) disposed between said hydraulic actuator and said hydraulic pump and controlling a flow rate of the hydraulic fluid, and operational signal generating means (4) for generating an electrical operational signal (X) to instruct a flow rate of the hydraulic fluid flowing through said flow control valve, said system computing a control signal (Y) while restraining a change rate (ΔX) of said operational signal to be kept not more than a preset maximum change rate, and controlling said flow control valve in accordance with the computed control signal, wherein said system comprises:

first determining means (500, 520–523) for determining the operating status of the construction machine based on said operational signal (X); and first processing means (500, 530–534) for setting therein an optimum maximum change rate (ΔY=fmax1(X), . . . ΔY=fmax32(X)) of the control signal (Y) for said flow control valve beforehand for each operating status of the construction machine, determining an optimum maximum change rate (ΔY) adapted for the operating status of the construction machine at that time based on a determination result of said first determining means, and setting the determined optimum maximum change rate as a maximum change rate of the control signal for said flow control valve (3).

2. A hydraulic circuit control system for a construction machine according to claim 1, wherein said system further comprises:

second determining means (300) for determining whether a value of the control signal (Y−1) for said flow control valve (3) is within a neutral zone; and second processing means (400) for computing the control signal (Y) in accordance with said operational signal (X) when the value of the control signal (Y−1) for said flow control valve (3) is within the neutral zone, instead of executing the processing to restrain the change rate of the control signal (Y) in accordance with the maximum change rate (ΔY).

3. A hydraulic circuit control system for a construction machine according to claim 1, wherein said first determining means (500, 520–523) determines, based on a state of said operational signal (X), in which one of acceleration, deceleration/stop, and lever-reversed condition the operating status of the hydraulic excavator is, and said first processing means (500, 530–534) determines the optimum maximum change rate (ΔY) adapted for the operating status of the construction machine at that time based on the optimum maximum change rate (ΔY=fmax1(X), . . . ΔY=fmax32(X)) of the control signal set beforehand for each operating status of acceleration, deceleration/stop, or lever-reversed condition.

4. A hydraulic circuit control system for a construction machine according to claim 1, wherein said first determining means (500, 520–523) determines the operating status of the construction machine based on said operational signal (X) and a previously outputted control signal (Y−1) for said flow control valve (3).

5. A hydraulic circuit control system for a construction machine according to claim 1, wherein the optimum maximum change rate (ΔY) of the control signal (Y) for said flow control valve (3) is set beforehand as a function (ΔY=fmax1(X), . . . ΔY=fmax32(X)) of said operational signal (X) for each operating status of the construction machine, and said first processing means (500, 530–534) computes the optimum maximum change rate (ΔY) based on the function of said operational signal corresponding to the operating status determined by said first determining means (500, 520–523) and the operational signal (X) at that time.

6. A hydraulic circuit control system for a construction machine according to claim 1, wherein the optimum maximum change rate (ΔY) of the control signal (Y) for said flow control valve (3) is set beforehand as a function (ΔY=fmax1(X), ΔY=fmax23(Y−1), . . . ΔY=fmax32(X)) of said operational signal (X) or the previously outputted control signal (Y−1) for said flow control valve (3) for each operating status of the construction machine, and said first processing means (500, 530, 531B, 532, 533B, 534) computes the optimum maximum change rate (ΔY) based on the function of said operational signal corresponding to the operating status determined by said first determining means (500, 520–523) or the function of the previously outputted control signal for said flow control valve (3) and the operational signal (X) at that time or the previously outputted control signal (Y−1) for said flow control valve (3).

* * * * *